United States Patent
Yoshida

(10) Patent No.: US 10,935,860 B2
(45) Date of Patent: Mar. 2, 2021

(54) DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/798,512

(22) Filed: Feb. 24, 2020

(65) Prior Publication Data

US 2020/0272011 A1 Aug. 27, 2020

Related U.S. Application Data

(60) Provisional application No. 62/811,000, filed on Feb. 27, 2019.

(51) Int. Cl.
*G02F 1/1362* (2006.01)
*G02F 1/1345* (2006.01)

(52) U.S. Cl.
CPC .... *G02F 1/136286* (2013.01); *G02F 1/13452* (2013.01); *G02F 2201/121* (2013.01); *G02F 2201/123* (2013.01)

(58) Field of Classification Search
CPC .................................................. G02F 1/136286
See application file for complete search history.

(56) References Cited

U.S. PATENT DOCUMENTS

| 2009/0310072 A1* | 12/2009 | Morii ................ G02F 1/133753 349/126 |
| 2020/0033684 A1 | 1/2020 | Tanaka et al. |
| 2020/0209692 A1* | 7/2020 | Kim .................. G02F 1/136286 |

FOREIGN PATENT DOCUMENTS

WO 2018/181665 A1 10/2018

* cited by examiner

*Primary Examiner* — Edmond C Lau
(74) *Attorney, Agent, or Firm* — Keating & Bennett, LLP

(57) ABSTRACT

A display device includes a liquid crystal layer, pixel electrodes, a common electrode, and conductive lines. The pixel electrodes each have an elongated shape and include bending portions in a middle with respect to a pixel electrode lengthwise direction. The common electrode overlaps the pixel electrodes via an insulator. The conductive lines extend in a pixel electrode widthwise direction to overlap the bending portions of the pixel electrodes via an insulator. The conductive lines are electrically connected to the common electrode.

13 Claims, 16 Drawing Sheets

DISPLAY DEVICE

CROSS REFERENCE TO RELATED APPLICATION

This application claims priority from U.S. Provisional Patent Application No. 62/811,000 filed on Feb. 27, 2019. The entire contents of the priority application are incorporated herein by reference.

TECHNICAL FIELD

The technology described herein relates to a display device.

BACKGROUND

An example of a conventional display device described in International Publication WO 2018/181665 has been known. The display device includes gate lines, source lines, driver components connected to the gate lines and the source lines, pixel electrodes connected to the driver components, and color filters disposed to correspond to the pixel electrodes. Each pixel electrode corresponds to a subpixel. One pixel includes multiple subpixels. The display device further includes conductive lines in a pixel region. The conductive lines extend along the gate lines or the source lines. At least sections of the conductive lines are disposed in pixel holes in the subpixels. An interval between the conductive lines is larger than an interval between the pixels.

In the display device, the conductive lines cross middle sections of the specific subpixels. Areas of the holes in the subpixels are reduced by the sections of the conductive lines that cross the subpixels. The subpixels over which the conductive lines cross have a width larger than the width of the subpixels over which the conductive lines do not cross. Therefore, the areas of the holes in the subpixels are less likely to differ from each other. However, the areas of the holes in the subpixels are still reduced by the conductive lines. Therefore, the conductive lines may result in a reduction in brightness.

SUMMARY

The technology described herein was made in view of the above circumstances. An object is to reduce a reduction in brightness.

A display device includes a liquid crystal layer, pixel electrodes, a common electrode, and conductive lines. Each of the pixel electrodes has an elongated shape. The pixel electrodes include bending portions in the middle with respect to a pixel electrode lengthwise direction. The common electrode overlaps the pixel electrodes via an insulator. The conductive lines extend in a pixel electrode widthwise direction and overlap the bending portions of the pixel electrodes via an insulator. The conductive lines are electrically connected to the common electrode.

According to the technology described herein, a reduction in brightness can be reduced.

DETAILED DESCRIPTION

First Embodiment

Figure 1:
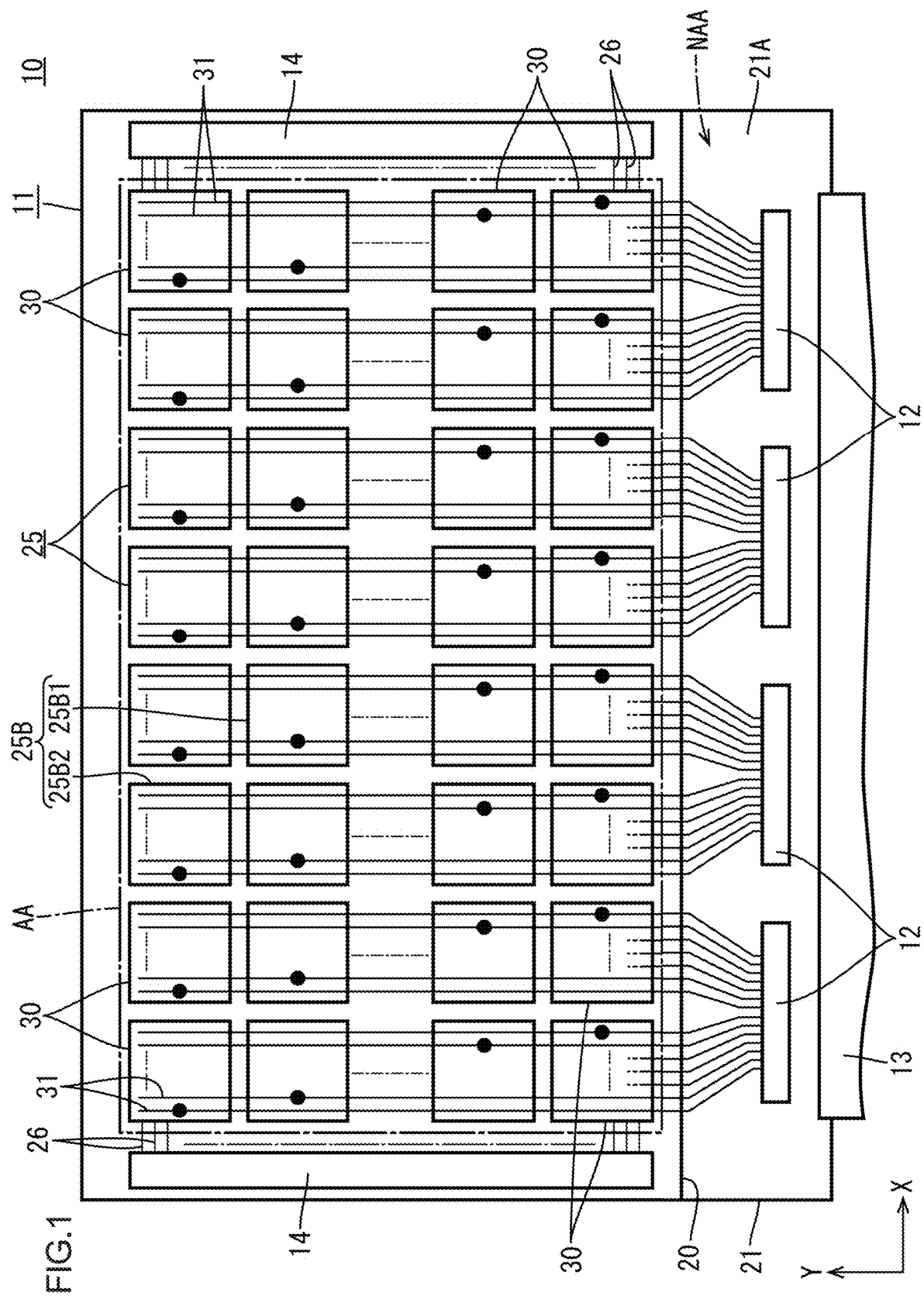
FIG. 1 is a plan view of a liquid crystal panel included in a liquid crystal display device according to a first embodiment illustrating touch electrodes and touch lines.

A first embodiment of the technology described herein will be described in detail with reference to FIGS. 1 to 10. In this section, a liquid crystal display device 10 (a display device having an input position detecting function) having a display function and a touch panel function (a positional input function) will be described. In the drawings, X-axes, Y-axes, and Z-axes may be present. The axes in each drawing correspond to the respective axes in other drawings. An upper side and a lower side in FIGS. 3, 6, 8, 9 and 10 correspond to a front side and a rear side of the liquid crystal display device 10, respectively.

FIG. 1 is a schematic plan view of a liquid crystal panel 11. As illustrated in FIG. 1, the liquid crystal display device 10 has a horizontally-long rectangular shape and includes at least the liquid crystal panel 11 (a display device, a display panel, a display panel having an input position detecting function), and a backlight unit (a lighting device). The liquid crystal panel 11 is configured to display images. The backlight unit is an external light source configured to apply light to the liquid crystal panel 11 for image display. In this embodiment, the liquid crystal panel 11 is provided with a screen size of about 15 inches (specifically, 15.6 inches) and FHD. The backlight unit is disposed behind (on a back side of) the liquid crystal panel 11. The backlight unit includes a light source (e.g., LEDs) configured to emit white light and an optical member configured to exert optical effects on the light from the light source to convert the light into planar light.

As illustrated in FIG. 1, the liquid crystal panel 11 includes a middle area defined as a display area AA (an area defined by a chain line in FIG. 1) in which images are displayed. An outer area of a screen of the liquid crystal panel 11 having a frame shape to surround the display area AA is defined as a non-display area NAA in which the images are not displayed. In this embodiment, a long dimension of the display area AA may be 346.6 mm and a short dimension of the display area AA may be 194.4 mm. The liquid crystal panel 11 includes two substrates 20 and 21 that are bonded together. One of the substrates 20 and 21 on the front side is a CF substrate 20 (an opposed substrate) and the other on the rear side (the back light) is an array substrate 21 (an active matrix substrate, a component substrate). The CF substrate 20 and the array substrate 21 include various films stacked on inner surfaces of glass substrates. Polarizing plates are bonded to outer surfaces of the substrates 20 and 21.

As illustrated in FIG. 1, the CF substrate 20 has a short dimension smaller than that of the array substrate 21. The CF substrate 20 is bonded to the array substrate 21 with one of edges separated from each other in a direction along a short edge aligned with a corresponding edge of the array substrate 21. The other edge of the array substrate 21 on an opposite side in the direction along the short edge laterally projects from the CF substrate 20. A portion of the array substrate 21 not overlapping the CF substrate 20 is defined as a CF substrate non-overlapping portion 21A. Drivers 12 (signal sources) and a flexible substrate 13 (a signal transmission medium) are mounted on the CF substrate non-overlapping portion 21A. Each driver 12 includes an LSI chip that includes a driver circuit therein. The drivers 12 are mounted on the array substrate 21 with the chip on glass (COG) technology. The drivers 12 are configured to process various signals transmitted by the flexible substrate 13. In this embodiment, four drivers 12 are arranged at intervals along the X-axis direction in the non-display area NAA of the liquid crystal panel 11. The flexible substrate 13 includes a substrate made of a synthetic resin having an insulating property and flexibility (e.g., a polyimide-based resin) and a number of line patterns formed on the substrate. The flexible substrate 13 includes a first end connected to the non-display area NAA of the liquid crystal panel 11 and a second end connected to a control circuit board (a signal source). The various signals supplied by the control circuit board are transmitted to the liquid crystal panel 11 via the flexible substrate 13 and output to the display area AA after processed by the drivers 12 in the non-display area NAA. In the non-display area NAA of the array substrate 21, two gate circuits 14 (second signal sources) are disposed to sandwich the display area AA therebetween from sides with respect to the X-axis direction. The gate circuits 14 are configured to perform feedings of the scanning signals to gate lines 26, which will be described later. The gate circuits 14 are provided in a monolithic form on the array substrate 21.

The liquid crystal panel 11 according to this embodiment has the display function and the touch panel function. The display function is for displaying images. The touch panel function is for detecting positions of inputs (input positions) by a user based on displayed images. Touch panel patterns for the touch panel function are integrated (with the in-cell technology). The touch panel patterns use a projected capacitance method. The touch panel patterns use a self-capacitance method for detection. As illustrated in FIG. 1, the touch panel patterns include touch electrodes 30 (position detecting electrodes) arranged in a matrix within a plate surface of the liquid crystal panel 11. The touch electrodes 30 are disposed in the display area AA of the liquid crystal panel 11. The display area AA of the liquid crystal panel 11 substantially corresponds with a touch area (an input position detectable area), in which positions of inputs are detectable. The non-display area NAA substantially corresponds with a non-touch area (an input position non-detectable area), in which positions of inputs are not detectable. A finger of the user is a conductive member (a position input member). When the user brings his or her finger closer to a surface (a display surface) of the liquid crystal panel 11 to perform a position input operation based on an image displayed in the display area AA of the liquid crystal panel 11, a capacitor is formed between the finger and the touch electrode 30. A capacitance measured at the touch electrode 30 adjacent to the finger varies as the finger approaches thereto. The capacitance becomes different from a capacitance measured at the touch electrode 30 away from the finger. Therefore, the position of input can be detected based on the difference in capacitance. Lines of the touch electrodes 30 are arranged at intervals in the X-axis direction (a direction in which pixel electrodes 24 sandwiching touch lines 31 are arranged) and the Y-axis direction (a direction in which the touch lines 31 extend) to form the matrix in the display area AA. Each of the touch electrodes 30 has a rectangular shape in a plan view. A length of each side is some millimeters (e.g., from 2 mm to 6 mm). If one side of the touch electrodes 30 is 5 mm, sixty-nine touch electrodes 30 are included in each line along the long edge (in the X-axis direction) and thirty-nine touch electrodes 30 are included in each line along the short edge (in the Y-axis direction), that is, 2,691 touch electrodes 30 are provided. The touch electrodes 30 are significantly larger than pixels PX, which will be described later, when viewed in plan. Each of the touch electrodes 30 straddles multiple pixels PX (e.g., dozens of the pixels PX) in the X-axis direction and the Y-axis direction. The touch lines 31 (position detecting lines) are selectively connected to the touch electrodes 30 provided in the liquid crystal panel 11. The touch lines 31 extend in the Y-axis direction to cross the touch electrodes 30 arranged in the Y-axis direction. The touch lines 31 are selectively connected to the specific touch electrodes 30. The touch lines 31 are independently connected to the touch electrodes 30. The number of the touch lines 31 overlapping one touch electrode 30 is equal to the number of the touch electrodes 30 in the Y-axis direction. In FIG. 1, sections of the touch lines 31 connected to the touch electrodes 30 (contact holes CH2 to CH4, which will be described later) are indicated by black dots. The touch lines 31 are connected to detector circuits. The detector circuits may be included in the drivers 12 or provided outside the liquid crystal panel 11 and connected via the flexible substrate 13. In FIG. 1, the arrangement of the touch electrodes 30 is schematically illustrated. The number, the arrangement, and the two-dimensional shape of the touch electrodes 30 may be altered from those illustrated in FIG. 1 where appropriate.

Figure 2:
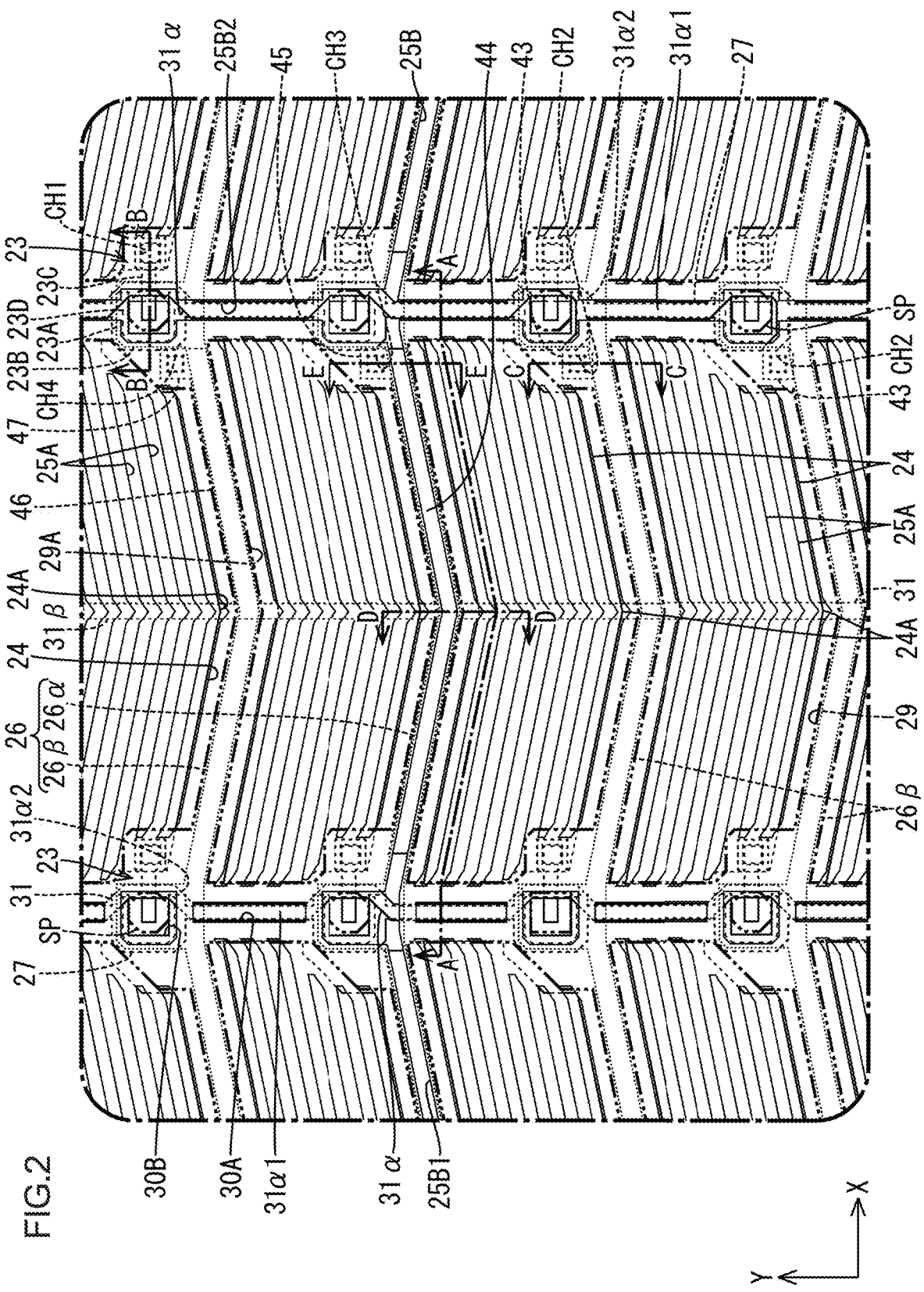
FIG. 2 is a plan view of the liquid crystal panel illustrating an arrangement of pixels.

FIG. 2 is a plan view of a section of the array substrate 21 and a section of the DF substrate 20 included in the liquid crystal panel 11 in the display area AA. As illustrated in FIG. 2, the touch electrodes 30 include touch line overlapping holes 30A (position detecting line overlapping holes) arranged to overlap sections of the touch lines 31. The touch line overlapping holes 30A extend in the Y-axis direction that corresponds with the direction in which the touch lines 31 extend. The touch line overlapping holes 30A are vertically long in a plan view (in an elongated form with a long dimension in the direction in which the touch lines 31 extend). The touch line overlapping holes 30A have a width (a dimension in the X-axis direction) larger than the width of the touch lines 31. With the touch line overlapping holes 30A overlapping at least sections of the corresponding touch lines 31, a parasitic capacitance between each touch line 31 and the touch electrodes 30 that are not connected to the touch line 31 can be reduced. Therefore, a proper level of sensitivity can be achieved in the position detection. The touch electrodes 30 include TFT overlapping holes 30B (switching component overlapping holes) arranged to overlap sections of TFTs 23, which will be described later. Spacers SP are disposed on the CF substrate 20 at positions overlapping the TFT overlapping holes 30B in the array substrate 21 to maintain a gap between substrates 20 and 21.

As illustrated in FIG. 2, thin film transistors (TFTs) 23 (pixel switch components) and pixel electrodes 24 are disposed on the inner surface of the array substrate 21, which is included in the liquid crystal panel 11, in the display area AA. Lines of the TFTs 23 and lines of the pixel electrodes 24 are arranged at intervals in the X-axis direction and the Y-axis direction to form a matrix. Around the TFTs 23 and the pixel electrodes 24, the gate lines 26 (second pixel lines, scanning lines) and the source lines 27 (pixel lines, signal lines, data lines) are routed substantially perpendicular to (to cross) each other. The gate lines 26 extend substantially in the X-axis direction. The source lines 27 extend substantially in the Y-axis direction. In this embodiment, the liquid crystal panel 11 is provided with the FHD and three colors of color filters 28 are repeatedly arranged along the source lines 27 (in the Y-axis direction), which will be described later. The number of the gate lines 26 is 1080×3=324. The number of the source lines 27 is 1,920. The gate lines 26 are connected to gate electrodes 23A of the TFTs 23. The source lines 27 are connected to source electrodes 23B of the TFTs 23. The pixel electrodes 24 are connected to drain electrodes 23C of the TFTs 23. The TFTs 23 turn on and off based on various signals supplied through the gate lines 26 and the source lines 27. The TFTs 23 controls application of voltages to the pixel electrodes 24 according to turn-on and turn-off of the TFTs 23. Each TFT 23 is disposed adjacent to one side of the pixel electrode 24 to which the TFT 23 is connected (on the left in FIG. 2).

As illustrated in FIG. 2, each of the pixel electrodes 24 has a rectangular shape in the plan view. A pixel electrode lengthwise direction corresponds with the X-axis direction and a pixel electrode widthwise direction corresponds with the Y-axis direction. A ratio of the long dimension of the pixel electrodes 24 to the short dimension of the pixel electrodes 24 is 3 to 1. Each gate line 26 is disposed between the pixel electrodes 24 adjacent to each other in the short dimension (the Y-axis direction). Each source line 27 is disposed between the pixel electrodes 24 adjacent to each other in the long dimension (the X-axis direction). The pixel electrodes 24 include bending portions 24A that have a bent shape in the plan view. The bending portions are located in the middle with respect to the long dimension. Specifically, each pixel electrode 24 is bent once at the middle to form a gentle V shape with ends thereof in the long dimension are slightly angled with respect to the X-axis direction and a peak form an obtuse angle. The bending portion 24A is located in the middle of the pixel electrode 24 with respect to the long dimension. The shape of the pixel electrode 24 is symmetric with respect to an imaginary center line extending in the short dimension and passing the bending portion 24A as if two parallelograms are connected to each other in the plan view. The bending portion 24A is located at a border between the parallelograms. The bending portion 24A extends linearly along the short dimension of the pixel electrode 24 to connect bending points at side edges of the pixel electrode 24. The gate lines 26 disposed between the pixel electrodes 24 that are adjacent to each other in the short dimension are parallel to the long edges of the pixel electrodes 24. The gate lines 26 are bent multiple times and routed in zigzags along the side edges of the pixel electrodes 24. An interval between the gate lines 26 is about equal to the short dimension of the pixel electrodes 24. An interval between the source lines 27 is about equal to the long dimension of the pixel electrodes 24. In comparison to a configuration in which pixel electrodes have a vertically-long shape, the interval between the source lines 27 is about equal to division of the short dimension of the pixel electrodes 24 by the long dimension of the pixel electrodes 24 (e.g., about ⅓). The number of the source lines 27 per unit length in the X-axis direction is about equal to the division (e.g., about ⅓). In comparison to the configuration in which the pixel electrodes have the vertically-long shape, an interval between the gate lines 26 is about equal to division of the long dimension of the pixel electrodes 24 by the short dimension of the pixel electrodes 24 (e.g., about 3). The number of the gate lines 26 per unit length in the X-axis direction is about equal to the division (e.g., about 3). Because the number of the source lines 27 can be reduced, the number of image signals supplied to the source lines 27 can be reduced. A black matrix 29 (an inter-pixel light blocking portion) is formed on the CF substrate 20. The black matrix 29 is indicated by long dashed and double short dashed lines in FIG. 2. The black matrix 29 includes pixel holes 29A at positions overlapping large areas of the pixel electrodes 24 in the plan view to form a grid shape and to separate the adjacent pixel electrodes 24 from each other. Through the pixel holes 29A, light passing through the pixel electrodes 24 exits out of the liquid crystal panel 11. The black matrix 29 is disposed to overlap at least the TFTs 23, the gate lines 26, and the source lines 27 (including the touch lines 31) on the array substrate 21 in the plan view.

Figure 3:
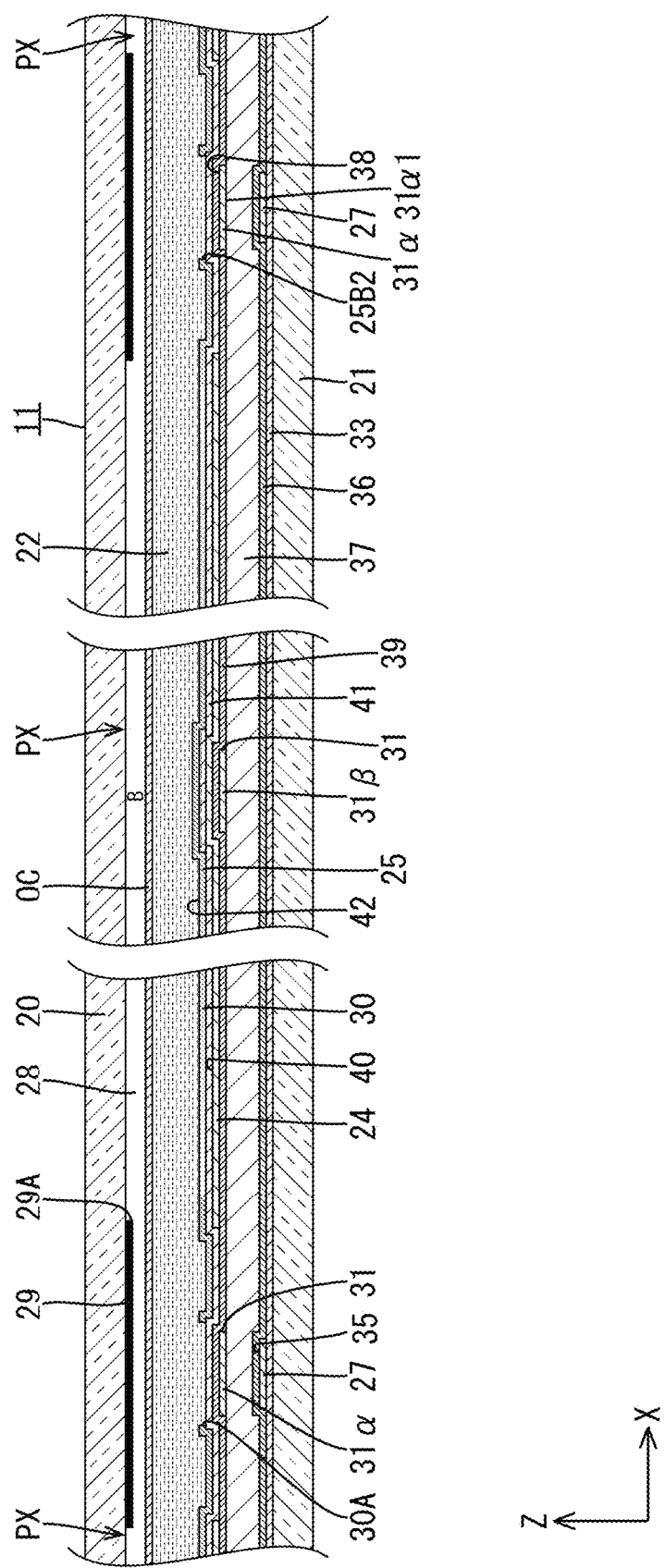
FIG. 3 is a cross-sectional view of the liquid crystal panel along line A-A in FIG. 2.

FIG. 3 is a cross-sectional view of a section of the liquid crystal panel 11 including the middle section of the pixel PX. As illustrated in FIG. 3, the liquid crystal panel 11 includes a liquid crystal layer 22 (a medium layer) disposed between the substrates 20 and 21. The liquid crystal layer 22 includes liquid crystal molecules. The liquid crystal molecules are substances having an optical characteristic that varies according to application of an electric field. In this embodiment, a liquid crystal material having positive dielectric constant anisotropy (a positive liquid crystal material) is used. Three colors of color filters 28 that exhibit blue (B), green (G), and red (R) are disposed on an inner surface side of the CF substrate 20 of the liquid crystal panel 11 in the display area AA. Lines of the color filters 28 are arranged in the X-axis direction and the Y-axis direction to form a matrix to overlap the pixel electrodes 24 on the array substrate 21 in the plan view. The color filters 28 that exhibit different colors are repeatedly arranged in lines along the source lines 27 (the Y-axis direction). The color filters 28 that exhibit the same color are arranged in lines along the gate lines 26 (the X-axis direction). In the liquid crystal panel 11, each R color filter 28, each G color filter 28, and the pixel electrode 24 that are arranged in the Y-axis direction and the pixel electrodes 24 that are opposed to the R, the G, and the B color filters 28 form three colors of the pixels PX. In the liquid crystal panel 11, the R, the G, and the B pixels PX arranged in the Y-axis direction form display pixels for color display in predefined tones. Intervals between the pixels PX in the Y-axis direction are about 60 μm. Intervals between the pixels PX in the X-axis direction are about 180 μm. The black matrix 29 is formed in a grid pattern in the plan view to separate the adjacent color filters 28 that are opposed to the adjacent pixel electrodes 24. A planarization film OC is formed in a solid pattern in a layer upper than the color filters 28 (on the liquid crystal layer 22 side) for an about entire area of the CF substrate 20. Alignment films are formed on the innermost surfaces of the substrates 20 and 21 contacting the liquid crystal layer 22 for orienting the liquid crystal molecules includes in the liquid crystal layer 22.

Figure 4:
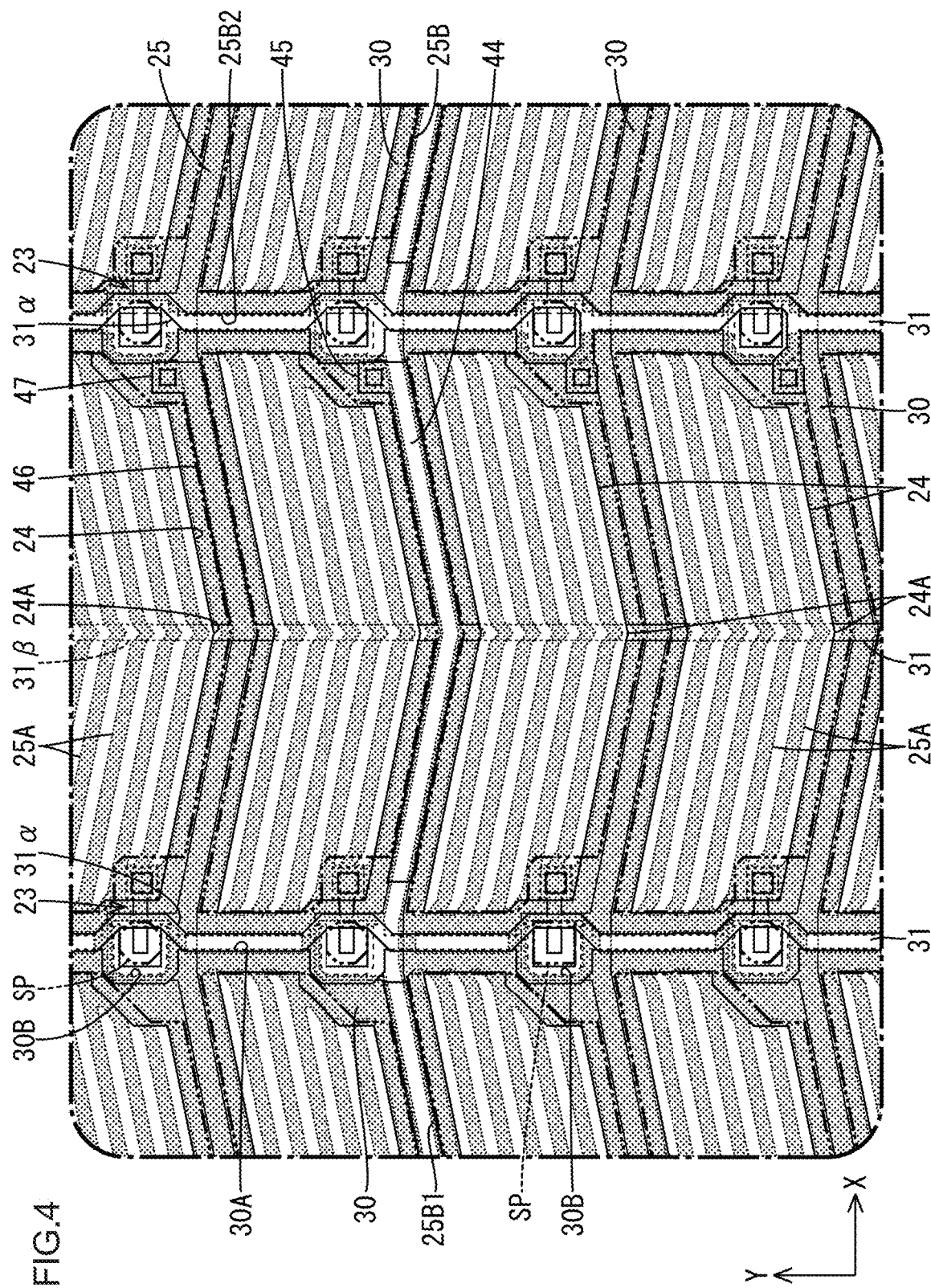
FIG. 4 is a plan view of an array substrate included in the liquid crystal panel illustrating a second transparent electrode film pattern.

Next, a common electrode 25 will be described with reference to FIGS. 2 to 4. FIG. 4 is a plan view of the array substrate 21 illustrating a pattern of the common electrode 25 (a second transparent electrode film 42, which will be described later). In FIG. 4, the second transparent electrode film 42 is indicated by hatching. As illustrated in FIGS. 2 to 4, the common electrode 25 is disposed in a layer upper than the pixel electrodes 24 on an inner surface side of the array substrate 21 in the display area AA to overlap all of the pixel electrodes 24. A constant reference voltage is normally supplied to the common electrode 25 except for periods for detecting positions of inputs by the finger, which is the position inputting member, (sensing periods). The common electrode 25 extends for the about entire display area AA. Sections of the common electrode 25 overlapping the pixel electrodes 24 include pixel overlapping voids 25A (pixel overlapping slits, orientation control slits). The pixel overlapping voids 25A extend in the pixel electrode lengthwise direction. The pixel overlapping voids 25A extend parallel to the long edges of the pixel electrodes 24 and bend in the middle (at about the middle). The number, the shape, and forming areas of the pixel overlapping voids 25A may be altered from those illustrated in the drawings where appropriate. When the pixel electrodes 24 are charged and differences are created between the pixel electrodes 24 and the common electrode 25 that overlap each other, fringe electric fields (oblique electric fields) are generated between edges of the pixel overlapping voids 25A and the pixel electrodes 24. Each fringe electric field includes a component along the plate surface of the array substrate 21 and a component in a normal direction to the plate surface of the array substrate 21. Using the fringe electric fields, the orientation of the liquid crystal molecules in the liquid crystal layer 22 can be controlled. The liquid crystal panel 11 in this embodiment is configured to operate in fringe field switching (FFS) mode. The pixel electrodes 24 in this embodiment have the elongated shape and include the bending portions 24A in the middle of the long dimension. Borders (hereinafter referred to as orientation borders) between regions in which orientations of the liquid crystal molecules based on the fringe electric fields that affect the liquid crystal layer 22 are different exit around the bending portions 24A of the pixel electrodes 24. Specifically, in this embodiment, the liquid crystal material having the positive dielectric constant anisotropy is used for the liquid crystal layer 22 and thus the liquid crystal molecules rotate counterclockwise on the left relative to the orientation borders in FIGS. 2 and 4 and clockwise on the right relative to the orientation borders in FIGS. 2 and 4. The control of the orientation of the liquid crystal molecules is difficult around the orientation borders resulting in a lower level of contribution to the image display.

As illustrated in FIGS. 2 to 4, the common electrode 25 includes the touch electrodes 30 that are described earlier. The common electrode 25 includes partition voids 25B (partition slits) for partitioning the adjacent touch electrodes 30 (see FIG. 1) in addition to the pixel overlapping voids 25A that are described earlier. The partition voids 25B include first void portions 25B1 and second void portions 25B2 to form a grid as a whole in the plan view. The first void portions 25B1 extend horizontally across the common electrode 25 for an entire dimension in the X-axis direction to separate the touch electrodes 30 that are adjacent to each other in the Y-axis direction. The second void portions 25B2 extend vertically across the common electrode 25 for an entire dimension in the Y-axis direction to separate the touch electrodes 30 that are adjacent to each other in the X-axis direction. The first void portions 25B1 are arranged to overlap the gate lines 26 disposed between the touch electrodes 30 that are adjacent to each other in the Y-axis direction. The gate lines 26 include void overlapping gate lines 26α (void overlapping pixel lines) disposed to overlap the first void portions 25B1 and void non-overlapping gate lines 26β disposed not to overlap the first void portions 25B1. Hereinafter, the suffix α is included in the symbol for the first gate lines and the suffix β is included in the symbol for the second gate lines when they are distinguished from each other. The suffixes are not included in the symbols when they are not distinguished from each other. The second void portions 25B2 are disposed to overlap the source lines 27 disposed between the touch electrodes 30 that are adjacent to each other in the X-axis direction. The common electrode 25 includes the touch electrodes 30 that are separated from each other by the partition voids 25B and arranged in the grid in the plan view. The touch electrodes 30 are electrically isolated from each other. The common signals (the reference voltage signals) related to the display function and the touch signals related to the touch panel function are transmitted to the touch electrodes 30 through the touch lines 31 at different timings (through time division multiplexing). The common signals are transmitted to all of the touch lines 31 at the same timing and thus all of the touch lines 31 are held at the reference potential and function as the common electrode 25.

Figure 5:
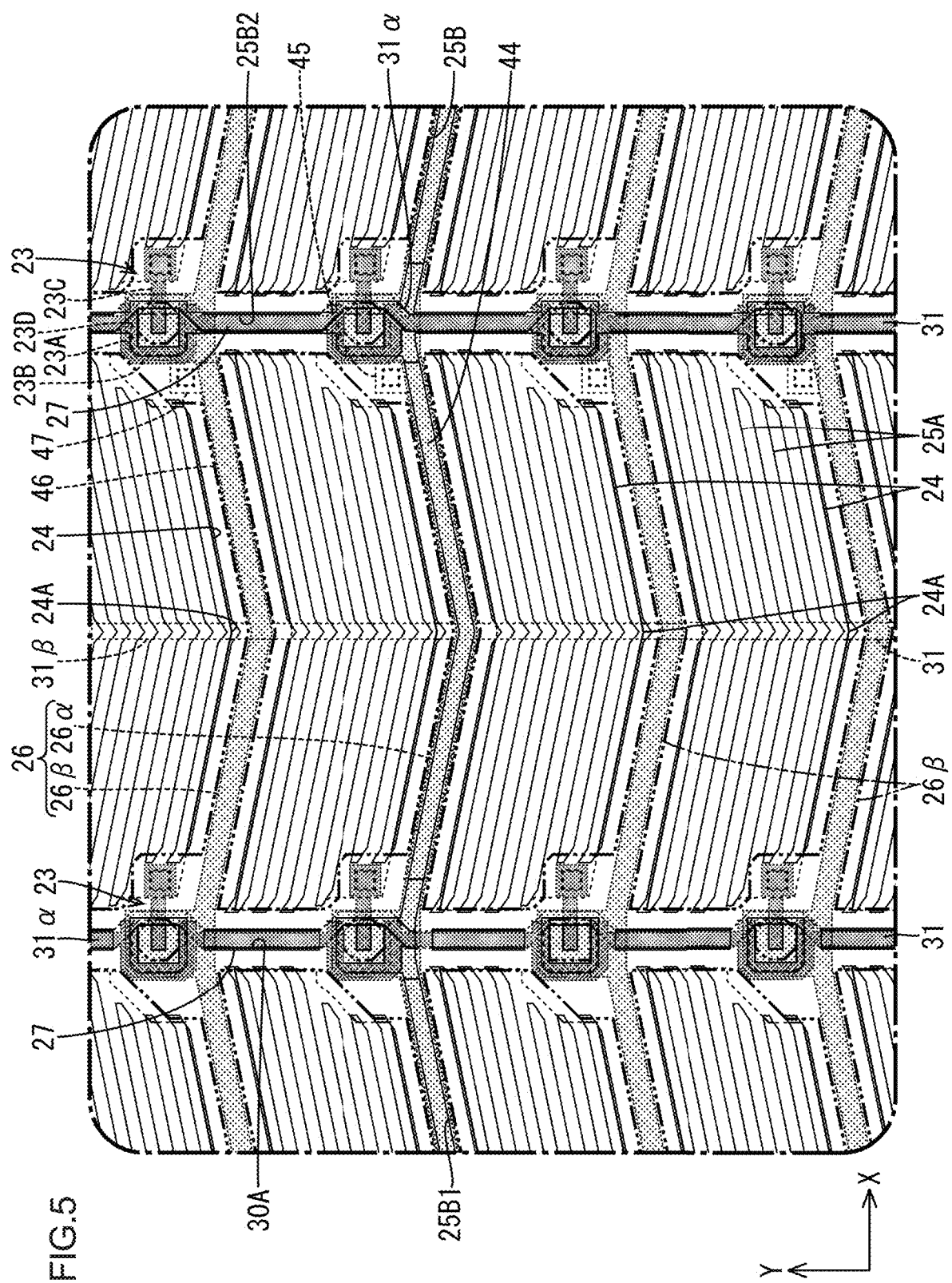
FIG. 5 is a plan view of the array substrate illustrating a first metal film pattern and a second metal film pattern.

Configurations of the TFTs 23 will be described in detail with reference to FIG. 5. FIG. 5 is a plan view of the array substrate 21 illustrating patterns including the electrodes 23A to 23C, the gate lines 26, and the source lines (a first metal film 32 and a second metal film 35, which will be described later). In FIG. 5, the first metal film 32 and the second metal film 35 are indicated by hatching. As illustrated in FIG. 2, the TFTs 23 include the gate electrodes 23A that branch out from the gate lines 26. Sections of the gate lines 26 crossing the source lines 27 are projected in the Y-axis direction toward the pixel electrodes 24 and defined as the gate electrodes 23A. Each of the gate electrodes 23A has a rectangular shape. The scanning signals transmitted through the gate lines 26 are supplied to the gate electrodes 23A. The TFTs 23 include the source electrodes 23B that include sections of the source lines 27 overlapping the gate electrodes 23A. Each of the source lines 27 include a section overlapping the corresponding gate line 26 bending along three edges of the gate electrode 23A to form a channel shape with an opening on the pixel electrode 24 side in the plan view. The section is defined as the source electrode 23B. The section of the source line 27 defined as the source electrode 23B is bent to an opposite side from the pixel electrode 24 connected to the source line 27 (on the left in FIG. 4) and go around the pixel electrode 24 to avoid interference (short circuit) with a drain electrode 23C, which will be described later. The TFTs 23 include drain electrodes 23C separated from the source electrodes 23B. Each drain electrode 23C is opposed to three edges of the corresponding source electrode 23B. Each drain electrode 23C includes an end overlapping a section (a corner) of the corresponding pixel electrode 24 in the plan view and connected to the section. The TFTs 23 include the channels 23D overlapping the gate electrodes 23A and connected to the source electrodes 23B and the drain electrodes 23C. Each of the channels 23D has a rectangular shape similar to that of the gate electrodes 23A in the plan view. Sections of each channel 23D including three edges are connected to the corresponding source electrode 23B and a section including the other edge is connected to the corresponding drain electrode 23C. When the TFTs 23 turn on based on the scanning signals supplied to the gate electrodes 23A, the image signals (the signals, the data signals) supplied to the source lines 27 are supplied to the drain electrodes 23C via the source electrodes 23B and the channels 23D. As a result, the pixel electrodes 24 are charged. The common electrode 25 includes the TFT overlapping holes 30B at the positions overlapping the channels 23D of the TFTs 23 (see symbol 30B in FIG. 4). The TFT overlapping holes 30B are provided for reducing variations in leak current between the source electrodes 23B and the drain electrodes 23C resulting from variations in voltage at the common electrode 25 (the touch electrodes 30) during periods in which the TFTs 23 are turned off including the sensing periods.

Figure 6:
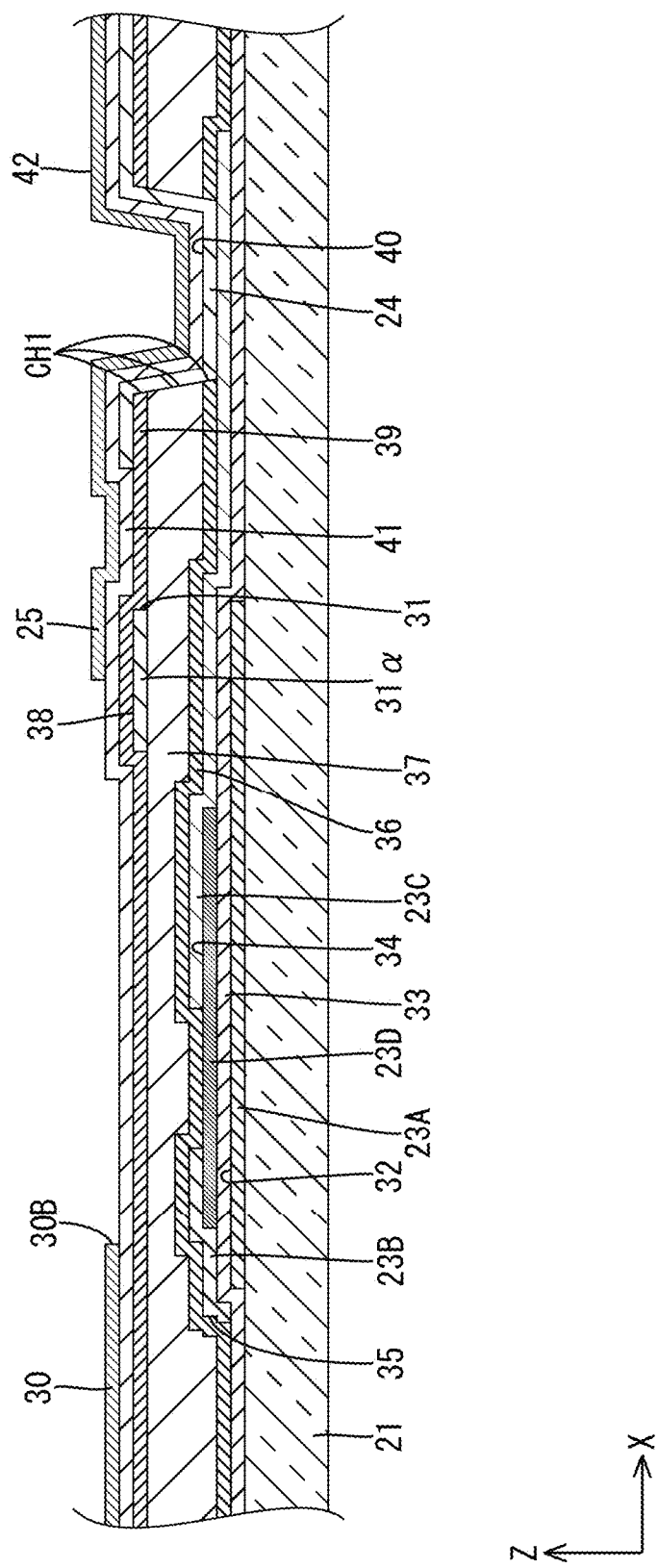
FIG. 6 is a cross-sectional view of the array substrate along line B-B in FIG. 2.

Various films stacked on the inner surface side of the array substrate 21 will be described with reference to FIG. 5. FIG. 6 is a cross-sectional view of a section of the array substrate 21 including the TFT 23. As illustrated in FIG. 6, on the array substrate 21, a first metal film 32, a gate insulator 33 (an insulator), a semiconductor film 34, the second metal film 35 (a second conductive film), a first interlayer insulator 36 (an insulator), a planarization film 37 (an insulator), a third metal film 38 (a first conductive film), a second interlayer insulator 39 (an insulator), a first transparent electrode film 40, an inter-electrode insulator 41 (an insulator), and the second transparent electrode film 42 are stacked in this sequence from a lower layer side on the array substrate 21. Each of the first metal film 32, the second metal film 35, and the third metal film 38 may be a single-layer film made of one kind of metal selected from copper, titanium, aluminum, molybdenum, and tungsten, a multilayer film made of different kinds of metals, or an alloy to have conductivity and a light blocking property. The gate lines 26 and the gate electrodes 23A of the TFTs 23 may be prepared from the first metal film 32. The source lines 27 and the source electrodes 23B and the drain electrodes 23C of the TFTs 23 may be prepared from the second metal film 35. The touch lines 31 may be prepared from the third metal film 38. The semiconductor film 34 may be a thin film made of a semiconductor material such as an oxide semiconductor material and an amorphous silicon material. The channels 23D of the TFTs 23 may be prepared from the semiconductor film 34. The first transparent electrode film 40 and the second transparent electrode film 42 may be made of a transparent electrode material (e.g., indium tin oxide (ITO)) or indium zinc oxide (IZO). The pixel electrodes 24 may be prepared from the first transparent electrode film 40. The common electrode 25 (the touch electrodes 30) are prepared from the second transparent electrode film 42.

The gate insulator 33, the first interlayer insulator 36, the second interlayer insulator 39, and the inter-electrode insulator 41 are made of inorganic materials such as silicon nitride ($SiN_x$) and silicon oxide ($SiO_2$). The planarization film 37 is made of an organic material such as PMMA (an acrylic resin material). The thickness of the planarization film 37 is larger than the thicknesses of other insulators 33, 36, 39 and 41 made of the inorganic materials. With the planarization film 37, a surface of the array substrate 21 is planarized. The gate insulator 33 insulates the first metal film 32 in the lower layer from the semiconductor film 34 and the second metal film 35 in the upper layers. The first interlayer insulator 36 and the planarization film 37 insulate the semiconductor film 34 and the second metal film 35 in the lower layers from the third metal film 38 in the upper layer. Sections of the first interlayer insulator 36 and the planarization film 37 overlapping both the drain electrodes 23C and the pixel electrodes 24 include pixel electrode contact holes CH1 for connecting the drain electrodes 23C to the pixel electrodes 24. The second interlayer insulator 39 insulates the third metal film 38 in the lower layer from the first transparent electrode film 40 in the upper layer. The inter-electrode insulator 41 insulates the first transparent electrode film 40 in the lower layer from the second transparent electrode film 42 in the upper layer.

Figure 7:
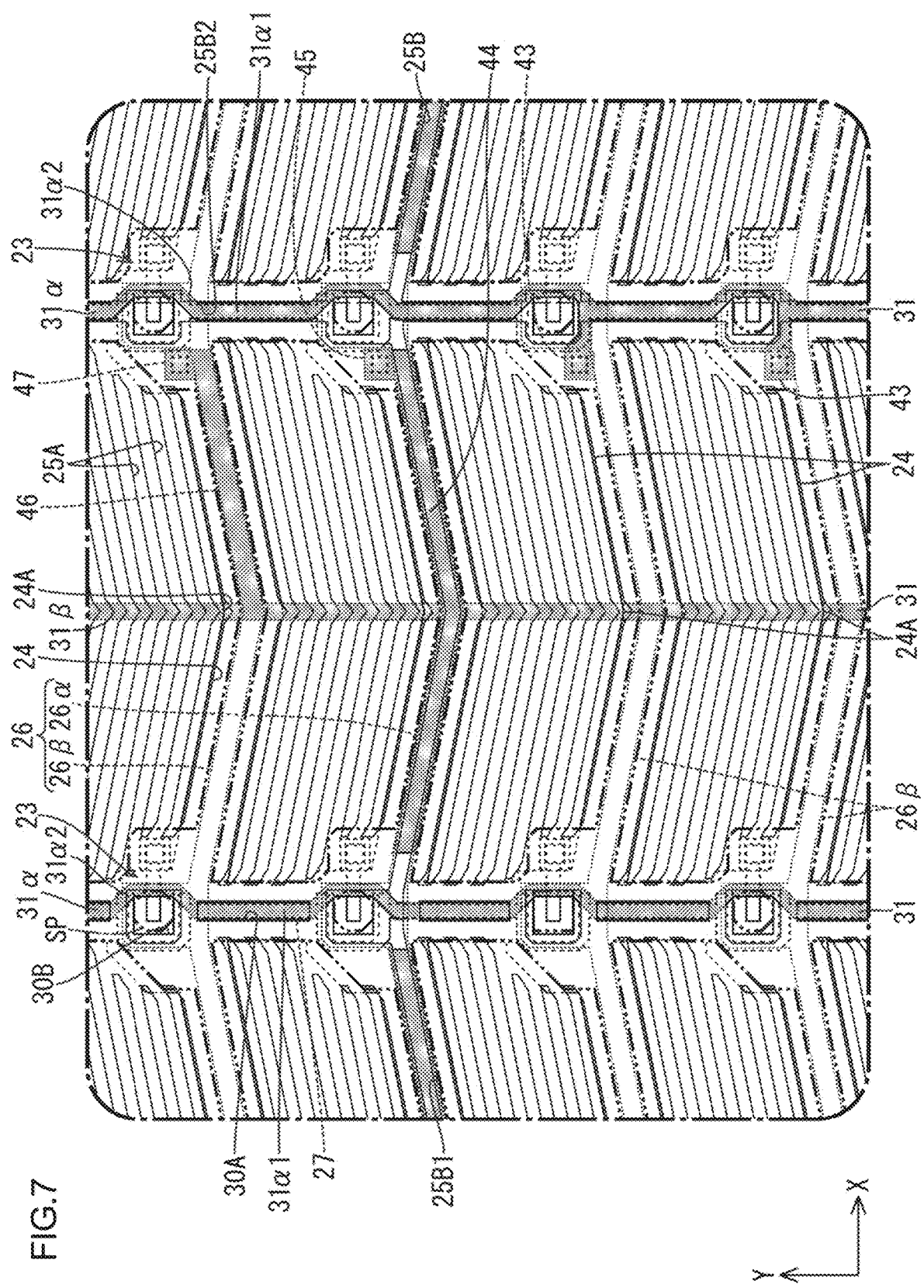
FIG. 7 is a plan view of the array substrate illustrating a third metal film pattern.

Next, a configuration of the touch lines 31 in the display area AA will be described with reference to at least FIG. 7. FIG. 7 is a plan view of the array substrate 21 illustrating a pattern of the third metal film 38 from which the touch lines 31 are prepared. In FIG. 7, the third metal film 38 is indicated by hatching. As illustrated in FIG. 7, the touch lines 31 include first touch lines 31α (second lines) and the second touch lines 31β (lines). The first touch lines 31α are disposed such that at least portions of the first touch lines 31α overlap the source lines 27. The second touch lines 31β are disposed not to overlap the source lines 27 but to cross the pixel electrodes 24. Hereinafter, the suffix α is included in the symbol for the first touch lines and the suffix β is included in the symbol for the second touch lines when they are distinguished from each other. The suffixes are not included in the symbols when they are not distinguished from each other. The first touch lines 31α and the second touch lines 31β are prepared from the third metal film 38. Line resistances of the first touch lines 31α and the second touch lines 31β are about equal to each other. Therefore, characteristics of the signals supplied to the touch electrodes 30 (the common electrode 25) are equalized. This configuration is preferable for maintaining the sensing sensitivity (display quality) at a high level.

As illustrated in FIG. 7, the first touch lines 31α extend substantially in the Y-axis direction. The first touch lines 31α are disposed to overlap large sections of the source lines 27 via the first interlayer insulator 36 and the planarization film 37 in the plan view. The source lines 27 are prepared from the second metal film 35. According to the configuration, short circuits are less likely to occur between the first touch lines 31α and the source lines 27. In comparison to a configuration in which entire areas of touch lines do not overlap the source lines 27, space required for the first touch lines 31α can be reduced. This configuration is preferable for increasing the aperture ratio. The large portions of the first touch lines 31α overlap the source lines 27. Some portions of the first touch lines 31α do not overlap the source lines 27 but cross the TFTs 23. The first touch lines 31α include source line overlapping portions 31α1 (line overlapping sections) and source line non-overlapping portions 31α2 (line non-overlapping portions). The source line overlapping portions 31α1 overlap the source lines 27 and the source line non-overlapping portions 31α2 do not overlap the source lines 27. According to the configuration, in comparison to a configuration in which the entire areas of the touch lines overlap the source lines 27, loads of the source lines 27 can be reduced by the source line non-overlapping portions 31α2. Therefore, the signals are less likely to be rounded. The source line overlapping portions 31α1 are disposed to overlap sections of the source lines 27 disposed between the TFTs 23 that are adjacent to each other in the Y-axis direction (sections adjacent to the short side edges of the pixel electrodes 24) and to extend linearly in the Y-axis direction. The source line non-overlapping portions 31α2 bend toward the pixel electrodes 24 to which the source lines 27 are connected in the X-axis direction (on the right in FIG. 7) and cross the drain electrodes 23C of the TFTs 23 to overlap the middle sections of the drain electrodes 23C. The first touch lines 31α are disposed to overlap the source lines 27, respectively. The number of the first touch lines 31α is equal to the number of the source lines 27. Specifically, the number of the touch lines 31α is 1,920 and the number of the touch electrodes 30 is less than 2,691.

Figure 8:
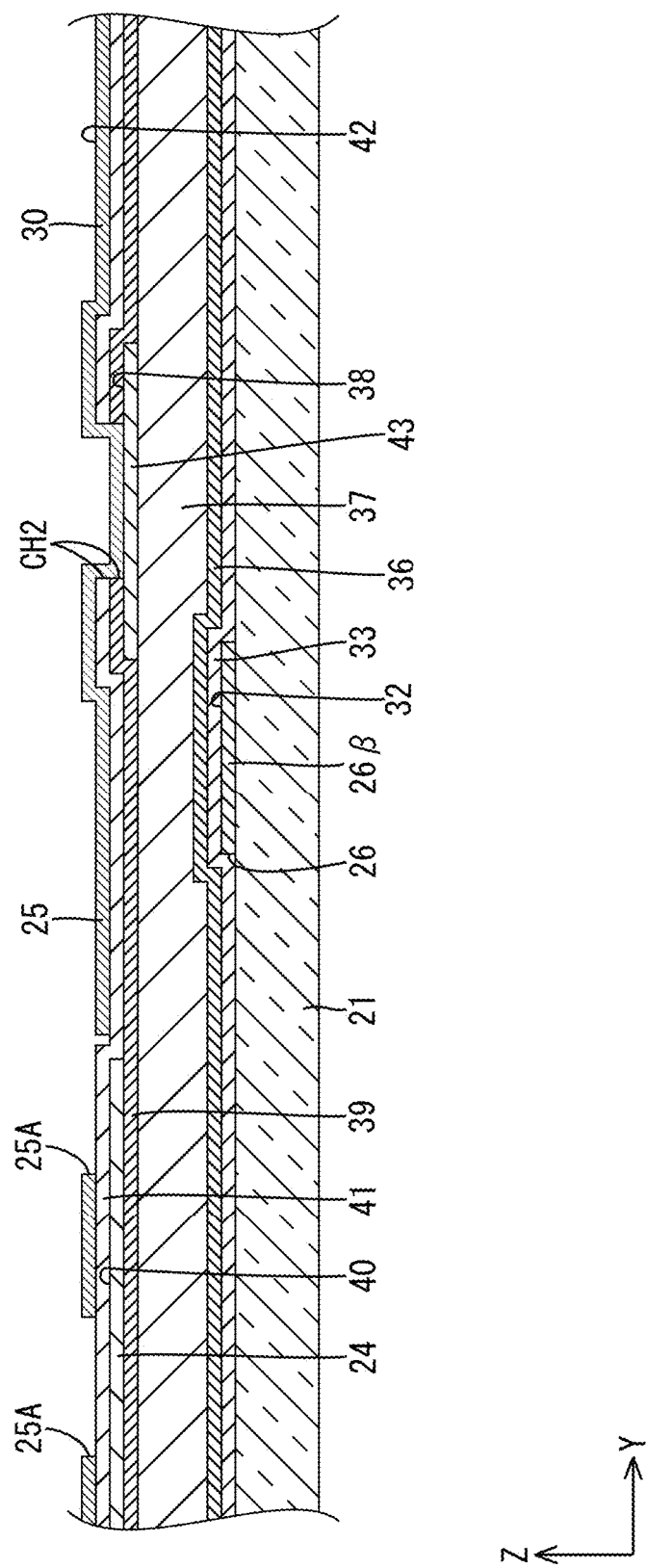
FIG. 8 is a cross-sectional view of the array substrate along line C-C in FIG. 2.

As illustrated in FIGS. 7 and 8, the touch lines 31α include first connecting portions 43 disposed to overlap the touch electrodes 30 (the common electrode 25) and connected to the touch electrodes 30. The first connecting portions 43 are disposed adjacent to the TFTs 23 to which the source lines 27 overlapping the first touch lines 31α are connected on an opposite side from connecting structures (pixel contact holes CH1) through which the TFTs 23 are connected to the pixel electrodes 24 in the X-axis direction. The first connecting portions 43 of the first touch lines 31α prepared from the third metal film 38 and the touch electrodes 30 prepared from the second transparent electrode film 42 are connected to each other via first contact holes CH2. The first contact holes CH2 are drilled through the second interlayer insulator 39 and the inter-electrode insulator 41 disposed between the first connecting portions 43 and the touch electrodes 30.

Figure 9:
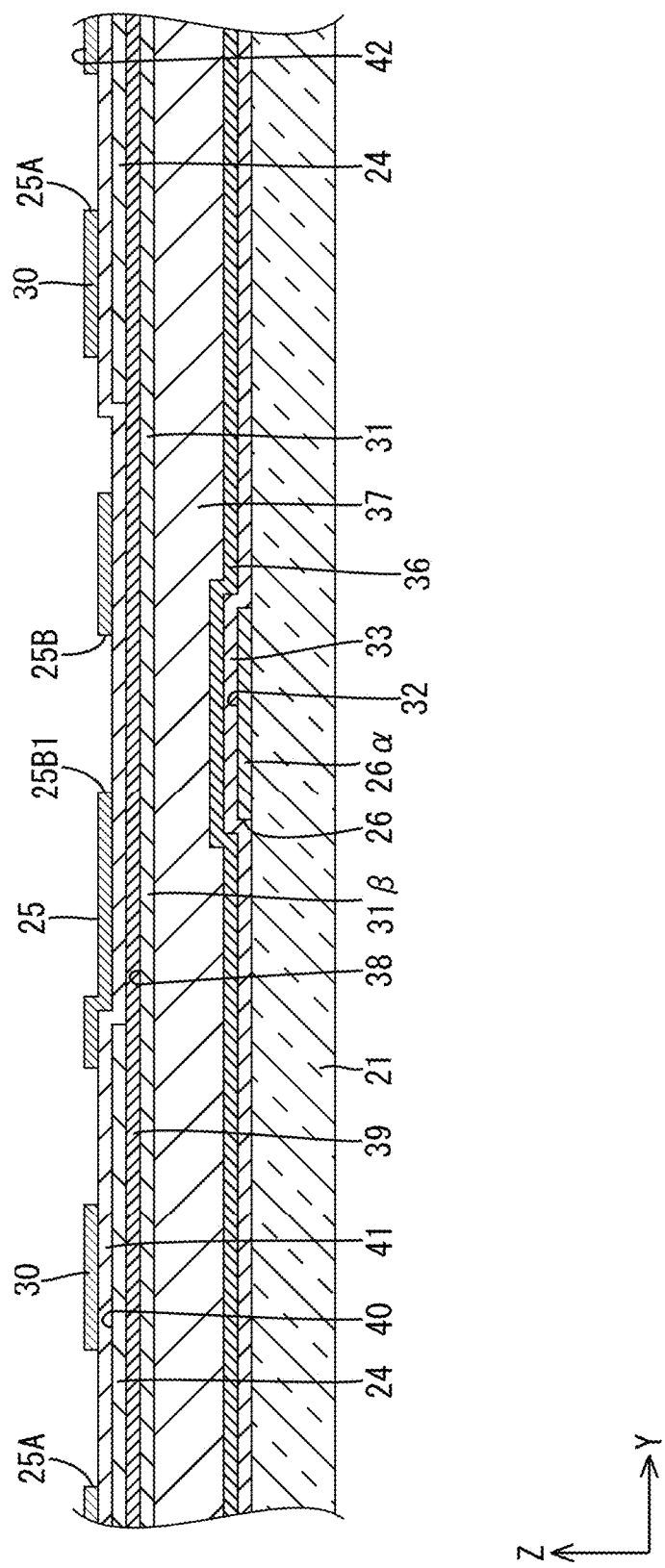
FIG. 9 is a cross-sectional view of the array substrate along line D-D in FIG. 2.

FIG. 9 is a cross-sectional view of a section of the array substrate 21 including the bending portions 24A of the pixel electrodes 24. As illustrated in FIGS. 7 and 9, the second touch lines 31β extend linearly in the Y-axis direction and cross the pixel electrodes 24 arranged in the Y-axis direction. The second touch lines 31β are disposed to overlap the bending portions 24A of the pixel electrodes 24 in the plan view. The second touch lines 31β prepared from the third metal film 38 are electrically isolated from the bending portions 24A of the pixel electrodes 24 prepared from the first transparent electrode film 40 by the second interlayer insulator 39 disposed therebetween. The second touch lines 31β are prepared from the third metal film 38 and thus do not pass light. If the second touch lines 31β are disposed to overlap the pixel electrodes 24, an amount of light transmitting through the pixel electrodes 24 decreases resulting in a reduction in brightness. In this embodiment, the second touch lines 31β are disposed to overlap the bending portions 24A that correspond with the orientation borders. Even if the light is blocked by the second touch lines 31β, the light less contributes to the image display and thus a reduction in brightness resulting from the second touch lines 31β can be suppressed. The touch lines 31β each having such a configuration are disposed to overlap the pixel electrodes 24 arranged in the X-axis direction, respectively. The number of the second touch lines 31β is equal to the number of each line of the pixel electrodes 24 in the X-axis direction. Specifically, the number of the second touch lines 31β is 1,920, which is equal to the number of the first touch lines 31α. The number of the touch lines 31 (the first touch lines 31α and the second touch lines 31β) is twice the number of the first touch lines 31α, that is, 3,840, which is larger than the number of the touch electrodes 30, that is, 2691. According to the configuration, at least the first touch lines 31α or the second touch lines 31β are connected to all the touch electrodes 30. The number of the touch electrodes 30 may be set equal to the number of the touch lines 31. Therefore, the size (one dimension) of each touch electrode 30 can be reduced and thus definition in the sensing (the position detection) can be improved.

Figure 10:
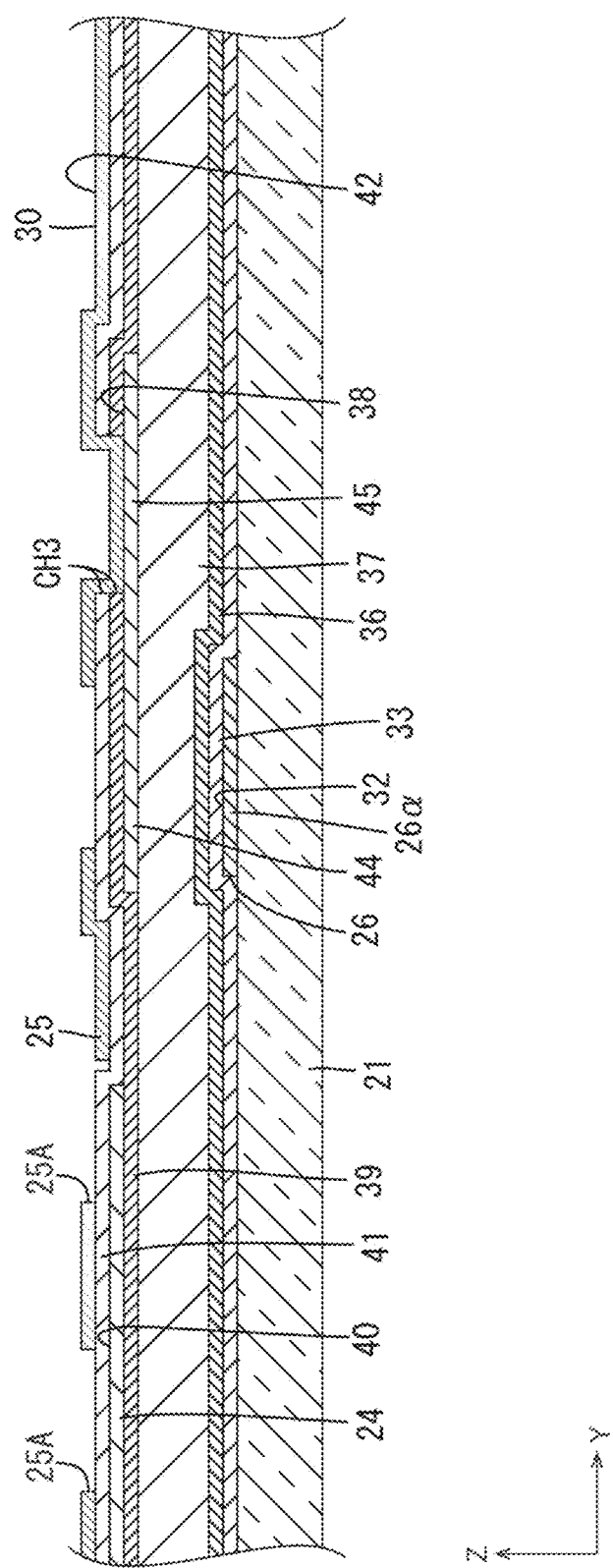
FIG. 10 is a cross-sectional view of the array substrate along line E-E in FIG. 2.

As illustrated in FIG. 7, shielding portions 44 are electrically connected to the second touch lines 31β. The shielding portions 44 are disposed to overlap the hole overlapping gate lines 26α. Each shielding portion 44 has a strip shape with a constant width to extend parallel to the hole overlapping gate lines 26α (in the pixel electrode lengthwise direction). The shielding portions 44 are arranged to overlap the first void portions 25B1 of the partition voids 25B. The width of the shielding portions 44 is slightly larger than the width of the hole overlapping gate lines 26α or the width of the first void portions 25B1. The width of the shielding portions 44 is smaller than the interval between the pixel electrodes 24 that are adjacent to each other in the Y-axis direction. Therefore, the shielding portions 44 do not overlap the pixel electrodes 24. The shielding portions 44 are prepared from the third metal film 38 from which the second touch lines 31β are prepared and coupled to the second touch lines 31β. The shielding portions 44 extend from the second touch lines 31β to be connected to the right and left in FIG. 7 along the hole overlapping gate lines 26α. Each shielding portion 44 has a gentle V shape with a vertex having an obtuse angle along the long edges of the pixel electrodes 24. The shielding portions 44 include distal ends. The distal ends on the left in FIG. 7 relative to the second touch lines 31β are disposed adjacent to the connecting structures (the pixel contact holes CH1) through which the TFTs 23 are connected to the pixel electrodes 24 that are overlapped with the second touch lines 31β. The distal ends on the right in FIG. 7 relative to the second touch lines 31β are disposed adjacent to the TFTs 23 to which the pixel electrodes 24 that are overlapped with the second touch lines 31β are not connected. The distal ends on the right in FIG. 7 relative to the second touch lines 31β are disposed adjacent to the second void portions 25B2 that separate the touch electrodes 30 that are adjacent to each other in the X-axis direction. The shielding portions 44 are disposed between the touch electrodes 30 that are adjacent to each other in the Y-axis direction. As illustrated in FIG. 10, the gate insulator 33, the first interlayer insulator 36, and the planarization film 37 are disposed between the shielding portions 44 prepared from the third metal film 38 and the hole overlapping gate lines 26α prepared from the first metal film 32 to electrically insulate the shielding portions 44 from the hole overlapping gate lines 26α. According to the configuration, the electric fields generated between the hole overlapping gate lines 26α and ends of the touch electrodes 30 on the first void portion 25B1 side are properly blocked by the shielding portions 44 that overlap the hole overlapping gate lines 26α. According to the configuration, a decrease in display quality due to the electric fields around the ends of the touch electrodes 30 on the partition void 25B side is less likely to occur. Because the shielding portions 44 overlap the hole overlapping gate lines 26α, the aperture rate is not reduced by the shielding portions 44.

As illustrated in FIG. 7, distal ends of the shielding portions 44 extending from the second touch lines 31β are connected to the touch electrodes 30 (the common electrode 25). The second touch lines 31β are electrically connected to the touch electrodes 30 via the shielding portions 44. Specifically, the shielding portions 44 include sections that are bifurcated from the second touch lines 31β and ends of the sections on the right relative to the second touch lines 31β in FIG. 7 are connected to the touch electrodes 30. The distal ends of the shielding portions 44 connected to the touch electrodes 30 are disposed adjacent to the TFTs 23 that are not connected to the pixel electrodes 24 over which the second touch lines 31β are disposed. Therefore, sufficient spaces can be provided for connecting structures for connecting the touch electrodes 30 (second connecting sections 45 and second contact holes CH3, which will be described later). In comparison to a configuration in which connecting structures for connecting the touch electrodes 30 are provided in the middle of the shielding portion 44, a reduction in brightness resulting from the connecting structures for connecting the touch electrodes 30 is less likely to occur. The distal ends of the shielding portion 44 connected to the touch electrodes 30 are bent to project upward in the Y-axis direction in FIG. 7. The projecting portions are disposed to overlap the touch electrodes 30 in the plan view and defined as the second connecting sections 45 connected to the touch electrodes 30. As illustrated in FIG. 10, the second connecting sections 45 of the shielding portion prepared from the third metal film 38 and the touch electrodes 30 prepared from the second transparent electrode film 42 are connected to each other via the second contact holes CH3 (contact holes) drilled through the second interlayer insulator 39 and the inter-electrode insulator 41 disposed between the second connecting sections 45 and the touch electrodes 30. The second connecting sections 45 are disposed adjacent to the second void portions 25B2 that separate the touch electrodes 30 that are adjacent to each other in the X-axis direction. In comparison to a configuration in which the second connecting sections and the second contact holes are provided in the middle of the shielding portion 44, the reduction in brightness resulting from the second connecting sections 45 and the second contact holes CH3 can be properly suppressed. The second connecting sections 45 and the first connecting sections 43 are linearly arranged in the Y-axis direction, that is, the arrangement of the second connecting sections 45 relative to the adjacent TFTs 23 is the same as the arrangement of the first connecting sections 43 relative to the adjacent TFTs 23.

As illustrated in FIG. 7, touch electrode connecting portions 46 (position detecting electrode connecting portions) are electrically connected to the second touch lines 31β in addition to the shielding portion 44. The touch electrode connecting portions 46 are disposed to overlap the hole non-overlapping gate lines 26β that are arranged such that the pixel electrodes 24 are sandwiched between the hole overlapping gate lines 26α and the hole non-overlapping gate lines 26β in the Y-axis direction. The touch electrode connecting portions 46 have a strip shape with a constant width to extend parallel to the hole non-overlapping gage lines 26β (in the pixel electrode lengthwise direction). Each touch electrode connecting portion 46 is disposed such that the pixel electrodes 24 are sandwiched between the touch electrode connecting portions 46 and the shielding portions 44 in the Y-axis direction. The touch electrode connecting portions 46 have the width slightly larger than the width of the hole non-overlapping gate lines 26β but smaller than the interval between the pixel electrodes 24 that are adjacent to each other in the Y-axis direction. Namely, the touch electrode connecting portions 46 do not overlap the pixel electrodes 24. The touch electrode connecting portions 46 are prepared from the third metal film 38 from which the second touch lines 31β and the shielding portions 44 are prepared. The touch electrode connecting portions 46 are directly coupled to the second touch lines 31β. The touch electrode connecting portions 46 project from the corresponding second touch lines 31β toward one side (the right in FIG. 7) along the hole non-overlapping gate lines 26β.

The distal ends of the touch electrode connecting portions 46 are disposed adjacent to the TFTs 23 that are not connected to the pixel electrodes 24 over which the second touch lines 31β are not disposed. The distal ends of the touch electrode connecting portions 46 are disposed adjacent to the second void portions 25B2 that separate the touch electrodes 30 that are adjacent to each other in the X-axis direction. The gate insulator 33, the first interlayer insulator 36, and the planarization film 37 are disposed between the touch electrode connecting portions 46 prepared from the third metal film 38 and the hole non-overlapping gate lines 26β prepared from the first metal film 32. Therefore, the touch electrode connecting portions 46 and the hole non-overlapping gate lines 26β are electrically isolated from each other. The relation between the touch electrode connecting portions 46 and the hole non-overlapping gate lines 26β is the same as the relation between the shielding portions 44 and the hole overlapping gate lines 26α illustrated in FIG. 10.

As illustrated in FIG. 7, the distal ends of the touch electrode connecting portions 46 extending from the second touch lines 31β are connected to the touch electrodes 30 (the common electrode 25). The second touch lines 31β are electrically connected to not only the shielding portions 44 but also the touch electrodes 30 via the touch electrode connecting portions 46. This provides a higher level of redundancy for the electrical connection between the second touch lines 31β and the touch electrodes 30 and a higher level of reliability in the electrical connection. The distal ends of the touch electrode connecting portions 46 are disposed adjacent to the TFTs 23 that are not connected to the pixel electrodes 24 over which the second touch lines 31β are disposed. Therefore, sufficient spaces are provided for the connecting structures for connecting the touch electrodes 30 (third connecting sections 47 and third contact holes CH4, which will be describe later). In comparison to a configuration in which the connecting structures for connecting the touch electrodes 30 are provided in the middle of the touch electrode connecting portions 46, the reduction in brightness resulting from the connecting structures for connecting the touch electrodes 30 can be properly suppressed. The distal ends of the touch electrode connecting portions 46 connected to the touch electrodes 30 are bent to project upward in the Y-axis direction in FIG. 7. The projecting sections are disposed to overlap the touch electrodes 30 in the plan view and defined as the third connecting sections 47 connected to the touch electrodes 30. The third connecting sections 47 of the touch electrode connecting portions 46 prepared from the third metal film 38 and the touch electrodes 30 prepared from the second transparent electrode film 42 are connected to each other via the third contact holes CH4 (second contact holes) drilled through the second interlayer insulator 39 and the inter-electrode insulator 41 disposed between the third connecting sections 47 and the touch electrodes 30. The configuration of the third contact holes CH4 is similar to the configuration of the second contact holes CH3 illustrated in FIG. 10. The third connecting sections 47 are disposed adjacent to the second void portions 25B2 that separate the touch electrodes 30 that are adjacent to each other in the X-axis direction. In comparison to a configuration in which the third connecting sections and the third contact holes are provided in the middle of the touch electrode connecting portions 46, the reduction in brightness resulting from the third connecting sections and the third contact holes CH4 can be further properly suppressed. The linear arrangement of the third connecting sections 47, the first connecting sections 43, and the second connecting sections 45 in the Y-axis direction, that is the positional relation between the third connecting sections 47 and the adjacent TFTs 23 is the same as the positional relation between the first connecting sections 43 or the second connecting sections 45 and the adjacent TFTs 23.

As descried above, the liquid crystal display device 10 (the display device) according to this embodiment includes the liquid crystal layer 22, the pixel electrodes 24, the common electrode 25, and the second touch lines 31β (the lines). The pixel electrodes 24 have the elongated shape and include the bending portions 24A in the middle of the long dimension. The common electrode 25 overlaps the pixel electrodes 24 via the inter-electrode insulator 41 (the insulator). The second touch lines 31β extend in the pixel electrode widthwise direction. The second touch lines 31β are disposed to overlap the bending portions 24A of the pixel electrodes 24 via the second interlayer insulator 39 (the insulator) and electrically connected to the common electrode 25.

The common voltage is applied to the common electrode 25, which overlaps the pixel electrodes 24 via the inter-electrode insulator 41, via the second touch lines 31β. When the pixel electrodes 24 are charged, potential differences are created between the pixel electrodes 24 and the common electrode 25. The orientation of the liquid crystal molecules in the liquid crystal layer 22 is controlled by the electric field generated based on the potential differences. The images are displayed based on the orientation of the liquid crystal molecules. The pixel electrodes 24 have the elongated shape and include the bending portions 24A in the middle of the long dimension. The borders (hereinafter referred to as the orientation borders) between regions in which orientations of the liquid crystal molecules based on the fringe electric fields that affect the liquid crystal layer 22 are different exit around the bending portions 24A of the pixel electrodes 24. The control of the orientation of the liquid crystal molecules is difficult around the orientation borders resulting in the lower level of contribution to the image display. The second touch lines 31β electrically connected to the common electrode 25 extend in the pixel electrode widthwise direction to overlap the bending portions 24A of the pixel electrodes 24 via the second interlayer insulator 39. Even if the light is blocked by the second touch lines 31β, the light is less likely to contribute to the image display and thus the reduction in brightness resulting from the second touch lines 31β is suppressed.

The liquid crystal display device 10 includes the TFTs 23 (the switching components), the source lines 27 (the pixel lines), and the first touch lines 31α (the second lines). The TFTs 23 are connected to the pixel electrodes 24. The source lines 27 extend in the short dimension. The source lines 27 are connected to the TFTs 23. The first touch lines 31α extend in the short dimension. At least sections of the first touch lines 31α overlap the source lines 27 via the first interlayer insulator 36 and the planarization film 37 (the insulator). The first touch lines 31α are electrically connected to the common electrode 25. According to the configuration, the signals for driving the TFTs 23 or the signals for charging the pixel electrodes 24 are transmitted through the source lines 27 to charge the pixel electrodes 24 according to the driving of the TFTs 23. At least the sections of the first touch lines 31α electrically connected to the common electrode 25 overlap the source lines 27. In comparison to a configuration in which entire areas of the first touch lines do not overlap the source lines 27, the spaces required for the first touch lines 31α are reduced. This configuration is preferable for increasing the aperture ratio. The first touch lines 31α are disposed such that at least the sections thereof overlap the source lines 27. If the number of the source lines 27 is reduced, the number of the first touch lines 31α may be reduced. The liquid crystal display device 10 includes the second touch lines 31β that overlap the bending portions 24A of the pixel electrodes 24. Therefore, the total number of the second touch lines 31β and the first touch lines 31α connected to the common electrode 25 is sufficiently large.

The liquid crystal display device 10 includes the touch electrodes 30 (the position detecting electrodes) and the drivers 12 (the signal sources). The common electrode 25 includes the touch electrodes 30 that are separated by the partition voids 25B. The touch electrodes 30 are connected to at least the second touch lines 31β or the first touch lines 31α to form capacitors with the position input member with which the position input is performed and to detect the positions of input by the position input member. The drivers 12 are electrically connected to the second touch lines 31β and the first touch lines 31α and configured to supply the common signals and the position detection signals to the second touch lines 31β and the first touch lines 31α through time division multiplexing. According to the configuration, at least the second touch lines touch lines 31β or the first touch lines 31α are electrically connected to the touch electrodes 30 included in the common electrode 25 and separated by the partition voids 25B. The touch electrodes 30 form capacitors with the position input member with which the position input is performed. With the signals supplied to at least the second touch lines 31β or the first touch lines 31α, positions of input by the position input member are detected. Because the total number of the second touch lines 31β and the first touch lines 31α is sufficiently large, a large number of the touch electrodes 30 are provided. According to the configuration, the accuracy in position detection improves.

The liquid crystal display device 10 includes the gate lines 26 (the second pixel lines) and the gate circuits 14 (the second signal sources). The gate lines 26 extend in the long dimension. The gate lines 26 are electrically connected to the TFTs 23. The gate circuits 14 are electrically connected to the gate lines 26 and configured to supply the signals to the gate lines 26 for driving the TFTs. The drivers are electrically connected to the source lines 27 and configured to supply the signals to the source lines 27 for charging the pixel electrodes 24. When the TFTs 23 turn on based on the signals from the gate circuits 14 transmitted through the gate lines 26, the signals from the drivers 12 transmitted through the source lines 27 are supplied to the pixel electrodes 24 via the TFTs 23. As a result, the pixel electrodes 24 are charged. The source lines 27 extend in the short dimension similarly to the second touch lines 31β and the first touch lines 31α. In comparison to a configuration in which the source lines extend in the long dimension, the source lines 27 can be easily routed and connected to the drivers 12.

The liquid crystal display device 10 includes the gate lines 26 electrically connected to the TFTs 23 and the shielding portions 44 electrically connected to the second touch lines 31β. The gate lines 26 extend in the long dimension. The gate lines 26 include the void overlapping gate lines 26α (the void overlapping pixel lines) disposed to overlap the partition voids 25B located between the touch electrodes 30 that are adjacent to each other in the short dimension. The shielding portions 44 are disposed to overlap the void overlapping gate lines 26α via the gate insulator 33, the first interlayer insulator 36, and the planarization film (the insulator) and electrically connected to the second touch lines 31β. According to the configuration, the signals for driving the TFTs 23 and charging the pixel electrodes 24 are transmitted through the source lines 27 and the gate lines 26 and the pixel electrodes 24 are charged according to the driving of the switching components. The void overlapping gate lines 26α included in the gate lines 26 are disposed to overlap the partition voids 25B located between the touch electrodes 30 that are adjacent to each other in the short dimension. When electric fields are generated between the void overlapping gate lines 26α and the ends of the touch electrodes 30 on the partition void 25B side, the display quality may decrease due to the electric fields around the ends of the touch electrodes 30 on the partition void 25B side. The shielding portions 44 are disposed to overlap the void overlapping gate lines 26α via the gate insulator 33, the first interlayer insulator 36, and the planarization film 37 and electrically connected to the second touch lines 31β. The shielding portions 44 block the electric fields between the void overlapping gate lines 26α and the ends of the touch electrodes 30 on the partition void 25B side. Therefore, the decrease in display quality resulting from the electric fields around the ends of the touch electrodes 30 on the partition void 25B side can be reduced. A decrease in aperture rate due to the shielding portions 44 is less likely to occur.

The shielding portions 44 are connected to the touch electrodes 30 via the second contact holes CH3 (the contact holes) in the second interlayer insulator 39 and the inter-electrode insulator 41 (the insulator) disposed between the shielding portions 44 and the touch electrodes 30. The shielding portions 44 are disposed to overlap the partition voids 25B. In comparison to a configuration in which the second touch lines disposed to overlap the pixel electrodes 24 are connected to the touch electrodes 30 via the second contact holes CH3, a decrease in brightness due to the second contact holes CH3 is properly reduced.

The shielding portions 44 extend from the second touch lines 31β, which are targets of connection, toward the partition voids 25B located between the touch electrodes 30 that are adjacent to each other in the long dimension. The distal ends of the shielding portions 44 adjacent to the partition voids 25B are connected to the touch electrodes 30 via the second contact holes CH3. The second contact holes CH3 via which the shielding portions 44 are connected to the touch electrodes 30 are adjacent to the partition voids 25B located between the touch electrodes 30 that are adjacent to each other in the long dimension. In comparison to a configuration in which the second contact holes are provided in the middle of the shielding portions 44, the decrease in brightness due to the second contact holes CH3 is further properly reduced.

The shielding portions 44 extend from the second touch lines 31β, which are targets of connection, toward the TFTs 23 and the distal ends of the shielding portions 44 adjacent to the TFTs 23 are connected to the touch electrodes 30 via the second contact holes CH3. In this configuration, the second contact holes CH3 for connecting the shielding portions 44 to the touch electrodes 30 are located adjacent to the TFTs 23. In comparison to a configuration in which the second contact holes are provided in the middle of the shielding portions 44, the decrease in brightness due to the second contact holes CH3 is further properly reduced.

The liquid crystal display device 10 includes the touch electrode connecting portions 46 (the position detecting electrode connecting portions). The touch electrode connecting portions 46 are disposed to overlap the gate lines 26 that are different from the void overlapping gate lines 26α via the gate insulator 33, the first interlayer insulator 36, and the planarization film 37 (the insulator). The touch electrode connecting portions 46 are electrically connected to the second touch lines 31β. The touch electrode connecting portions 46 are connected to the touch electrodes 30 via the third contact holes CH4 (the second contact holes) drilled through the second interlayer insulator 39 and the inter-electrode insulator 41 (the insulator) disposed between the touch electrode connecting portions 46 and the touch electrodes 30. In this configuration, the shielding portions 44 and the touch electrode connecting portions 46 that are electrically connected to the second touch lines 31β are connected to the touch electrodes 30 via the second contact holes CH3 and the third contact holes CH4. This provides a higher level of redundancy for the electrical connection between the second touch lines 31β and the touch electrodes 30 and a higher level of reliability in the electrical connection. The touch electrode connecting portions 46 are disposed to overlap the gate lines 26 via the gate insulator 33, the first interlayer insulator 36, and the planarization film 37. Therefore, a decrease in aperture rate due to the touch electrode connecting portions 46 is less likely to occur.

The first touch lines 31α include the source line overlapping portions 31α1 (the line overlapping portions) and the source line non-overlapping portions 31α2 (the line overlapping portions). The source line overlapping portions 31α1 overlap the source lines 27. The source line non-overlapping portions 31α2 are disposed to cross the TFTs 23 and not to overlap the source lines 27. In comparison to a configuration in which entire areas of the first touch lines overlap the source lines 27, the loads of the source lines 27 are reduced by the loads of the source line non-overlapping portions 31α2. Therefore, the signals are less likely to be rounded.

The second touch lines 31β and the first touch lines 31α include sections of the third metal film 38 (the conductive film). According to the configuration, the line resistances of the second touch lines 31β and the first touch lines 31α are about equal. Therefore, characteristics of the signals supplied to the common electrode 25 are equalized. This configuration is preferable for maintaining the display quality at the high level. In comparison to a configuration in which the second touch lines 31β and the first touch lines 31α are made of different materials, a production process can be simplified.

Second Embodiment

A second embodiment of the technology described herein will be described with reference to FIGS. 11 to 14. The second embodiment includes second touch lines 131β configured different from the first embodiment. Components, functions, and effects similar to those of the first embodiment previously described will not be described.

Figure 11:
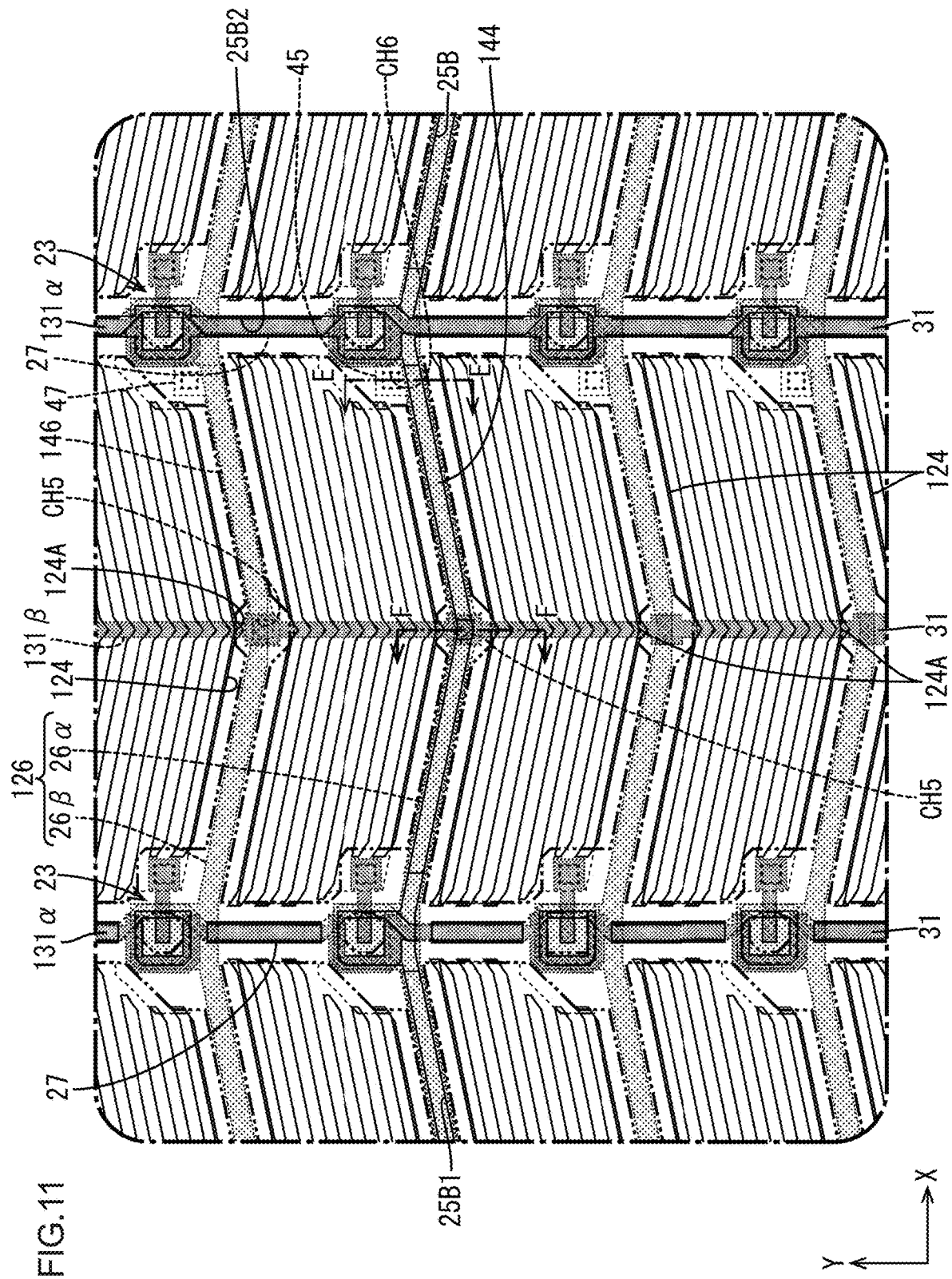
FIG. 11 is a plan view of an array substrate included in a liquid crystal panel according to a second embodiment illustrating a first metal film pattern and a second metal film pattern.
Figure 12:
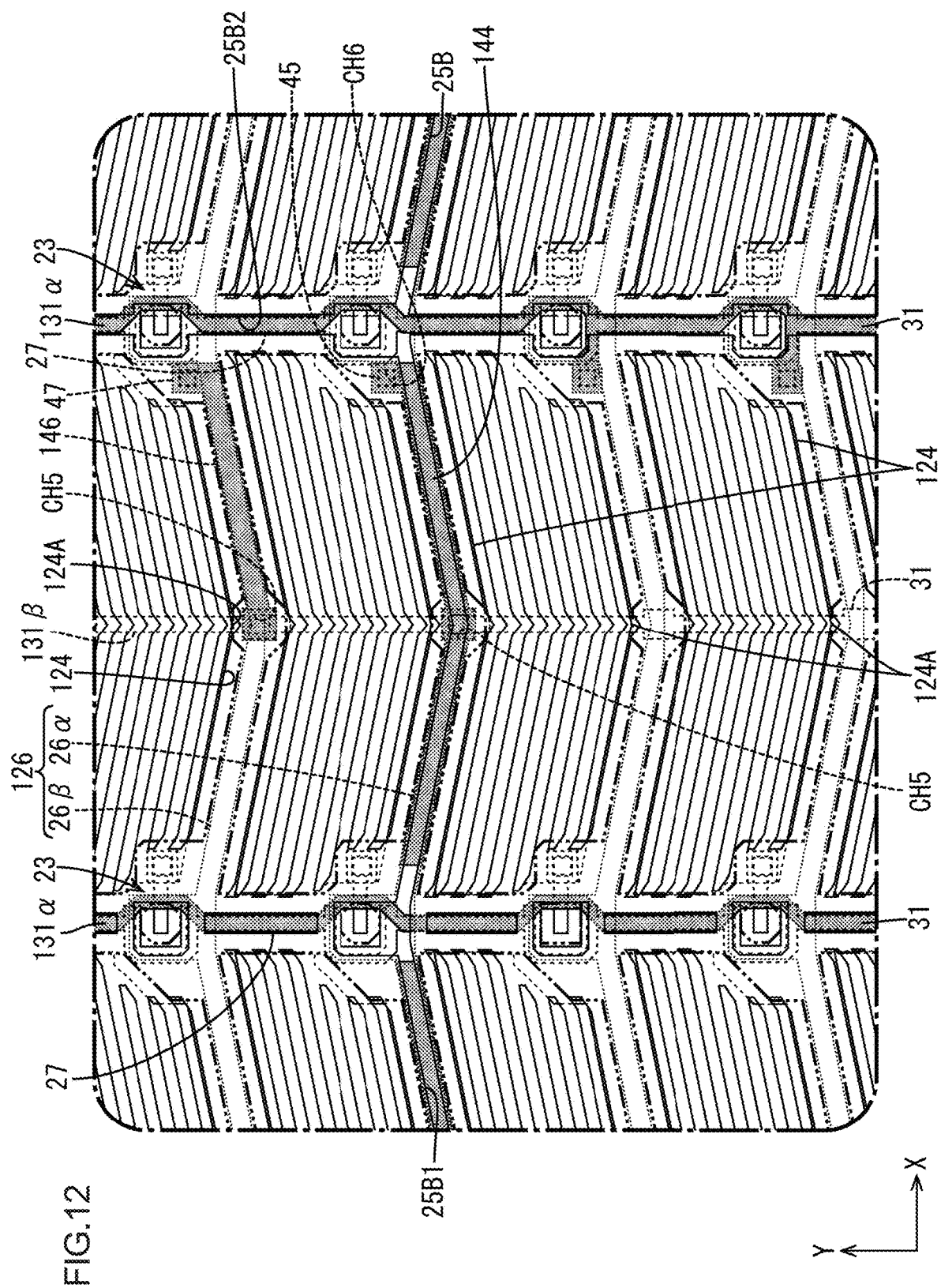
FIG. 12 is a plan view of the array substrate illustrating a third metal film pattern.
Figure 13:
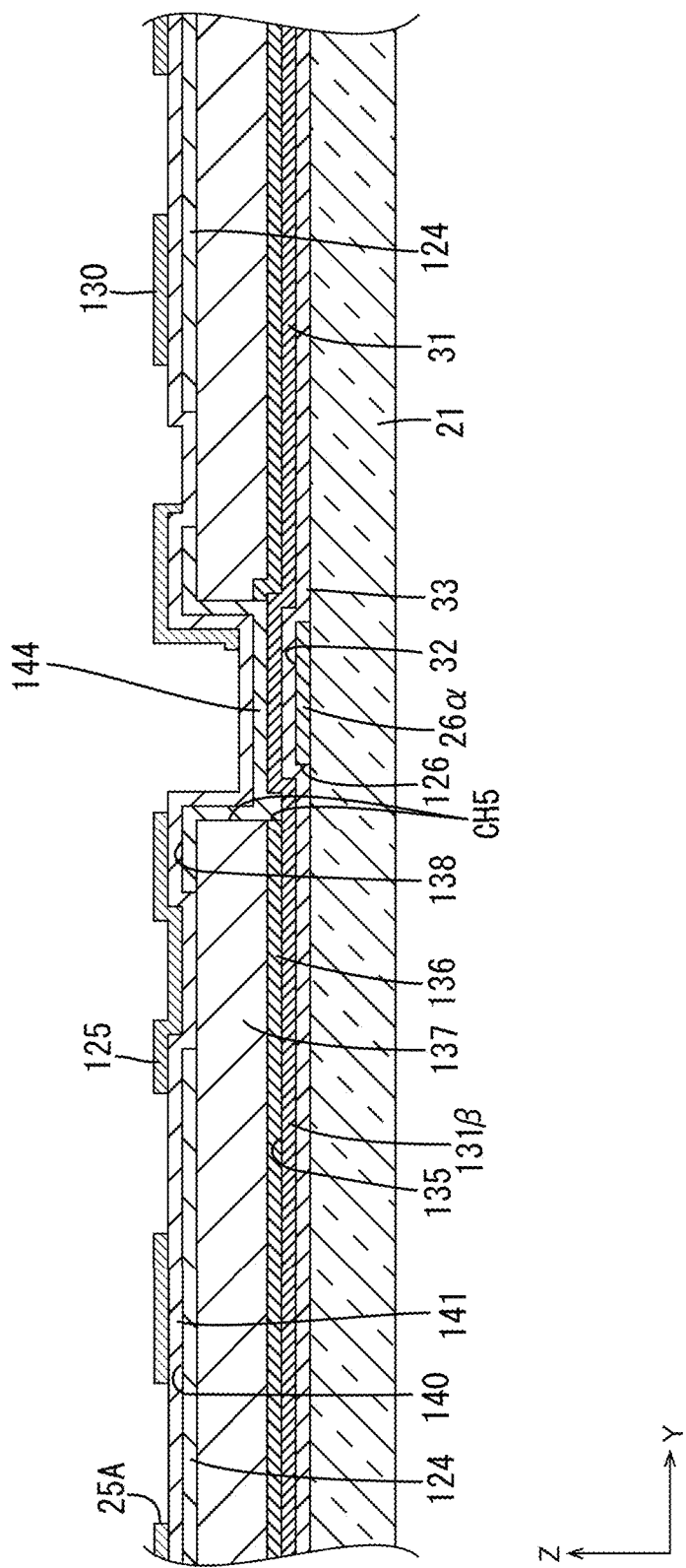
FIG. 13 is a cross-sectional view of the array substrate along line F-F in FIG. 11.

As illustrated in FIG. 11, the second touch lines 131β in this embodiment is prepared from a second metal film 135 (a second conductive film). First touch lines 131α, a shielding portion 144 (a common electrode connecting portion), and touch electrode connecting portions 146 (common electrode connecting portions) illustrated in FIG. 12 are prepared from a third metal film 138 (a first conductive film). As illustrated in FIG. 13, the second touch lines 131β prepared from the second metal film 135 are disposed in a layer different from the first touch lines 131α, the shielding portion 144, and the touch electrode connecting portions 146 prepared from the third metal film 138 with a first interlayer insulator 136 and a planarization film 137 disposed between the second metal film 135 and the third metal film 138. This embodiment does not include the second interlayer insulator 39 included in the first embodiment. A first transparent electrode film 140 from which pixel electrodes 124 are prepared is disposed in a layer upper than the planarization film 137, that is, the layer in which the third metal film 138 is disposed. If the second touch lines are prepared from the third metal film 138, a short circuit may be created between the second touch line and the pixel electrode 124 that overlap the second touch line. In this embodiment, the second touch lines 131β are prepared from the second metal film 135. The first interlayer insulator 136 and the planarization film 137 are disposed between the second touch lines 131β and the pixel electrodes 124 that overlap the second touch lines 131β. Therefore, a short circuit is less likely to be created between the second touch lines 131β and the pixel electrodes 124.

Figure 14:
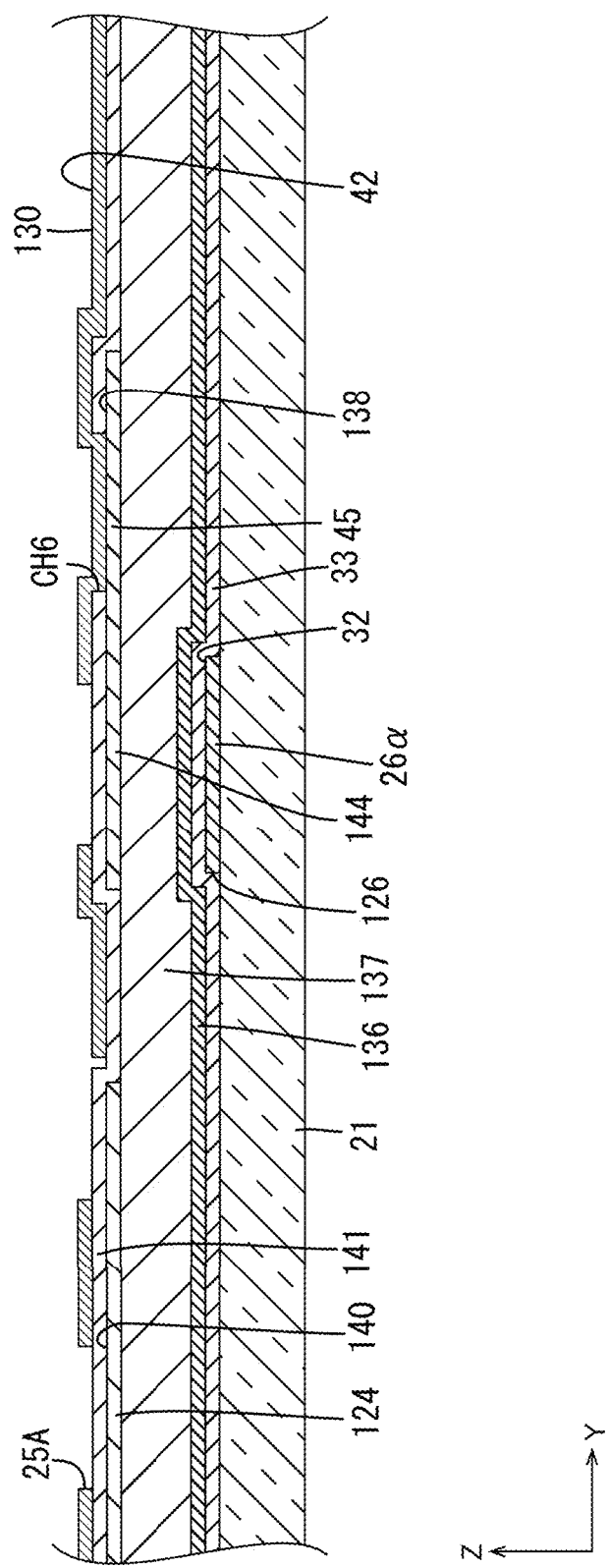
FIG. 14 is a cross-sectional view of the array substrate along line E-E in FIG. 11.

As illustrated in FIGS. 12 and 13, the second touch lines 131β prepared from the second metal film 135 are connected to the shielding portion 144 and the touch electrode connecting portions 146 prepared from the third metal film 138 via second touch line-side contact holes CH5 (line-side contact holes) drilled through the first interlayer insulator 136 and the planarization film 137 disposed between the second metal film 135 and the third metal film 138. The second touch line-side contact holes CH5 are arranged to overlap bending portions 124A of the pixel electrodes 124. Therefore, a decrease in brightness due to the second touch line-side contact holes CH5 is properly reduced. As illustrated in FIGS. 12 and 14, the shielding portion 144 and the touch electrode connecting portions 146 prepared from the third metal film 138 are connected to a common electrode 125 (touch electrodes 130) via common electrode-side contact holes CH6 drilled through an inter-electrode insulator 141 disposed between the third metal film 138 and the common electrode 125. The common electrode-side contact holes CH6 are practically the same as the second contact holes CH3 and the third contact holes CH4 in the first embodiment. Because of the arrangement of the common electrode-side contact holes CH6, a decrease in brightness due to the common electrode-side contact holes CH6 is properly reduced. According to the configuration, signals transmitted through the second touch lines 131β are supplied to the common electrode 125 via the shielding portion 144 and the touch electrode connecting portions 146. The shielding portion 144 and the touch electrode connecting portions 146 are disposed between the pixel electrodes 124 that are adjacent to each other in the Y-axis direction. Therefore, a short circuit is less likely to be created between the pixel electrodes 124 and the shielding portion 144 or the touch electrode connecting portions 146. As illustrated in FIG. 11, gate lines 126 include portions that cross the second touch lines 131β and have a smaller width. With the portions, parasitic capacitances between the gate lines 126 and the second touch lines 131β are reduced.

In this embodiment, the first touch lines 131α are prepared from the third metal film 138 (the first conductive film) disposed in the layer in which the pixel electrodes 124 are disposed. The second touch lines 131β are prepared from the second metal film 135 (the second conductive film) disposed in the layer different from the third metal film 138 with the first interlayer insulator 136 and the planarization film 137 (the insulator) disposed between the second metal film 135 and the third metal film 138. Because the second touch lines 131β are prepared from the second metal film 135 disposed in the layer different from the layer in which the pixel electrodes 124 and the third metal film 138 are disposed with the first interlayer insulator 136 and the planarization film 137 (the insulator) disposed between the second metal film 135 and the third metal film 138, a short circuit is less likely to be created between the second touch lines 131β and the pixel electrodes 124. Because the third metal film 138 from which the first touch lines 131α is prepared is disposed in the layer in which the pixel electrodes 124 are disposed without an insulator therebetween, formation of the insulator is not required and thus a cost can be reduced.

The second embodiment includes the shielding portions 144 and the touch electrode connecting portions 146 (the common electrode connecting portions) prepared from the third metal film 138 and disposed between the pixel electrodes 124 that are adjacent to each other in the short dimension. The shielding portions 144 and the touch electrode connecting portions 146 are connected to the second touch lines 131β via the second touch line-side contact holes CH5 (the line-side contact holes) drilled through the first interlayer insulator 136 and the planarization film 137 (the insulator) disposed therebetween. The shielding portions 144 and the touch electrode connecting portions 146 are connected to the common electrode 125 via the common electrode-side contact holes CH6 drilled through the inter-electrode insulator 141 (the insulator) disposed therebetween. The shielding portions 144 and the touch electrode connecting portions 146 prepared from the third metal film 138 disposed in the layer in which the pixel electrodes 124 are disposed are disposed between the pixel electrodes 124 that are adjacent to each other in the short dimension. Therefore, a short circuit is less likely to be created between the pixel electrodes 124 and the shielding portions 144 or the touch electrode connecting portions 146. The shielding portions 144 and the touch electrode connecting portions 146 are connected to the second touch lines 131β and the common electrode 125 via the second touch line-side contact holes CH5 and the common electrode-side contact holes CH6. Therefore, signals transmitted through the second touch lines 131β are supplied to the common electrode 125 via the shielding portion 144 and the touch electrode connecting portions 146.

Third Embodiment

A third embodiment of the technology described herein will be described with reference to FIGS. 15 and 16. The third embodiment includes first touch lines 231α configured different from the first embodiment. Components, functions, and effects similar to those of the first embodiment previously described will not be described.

Figure 15:
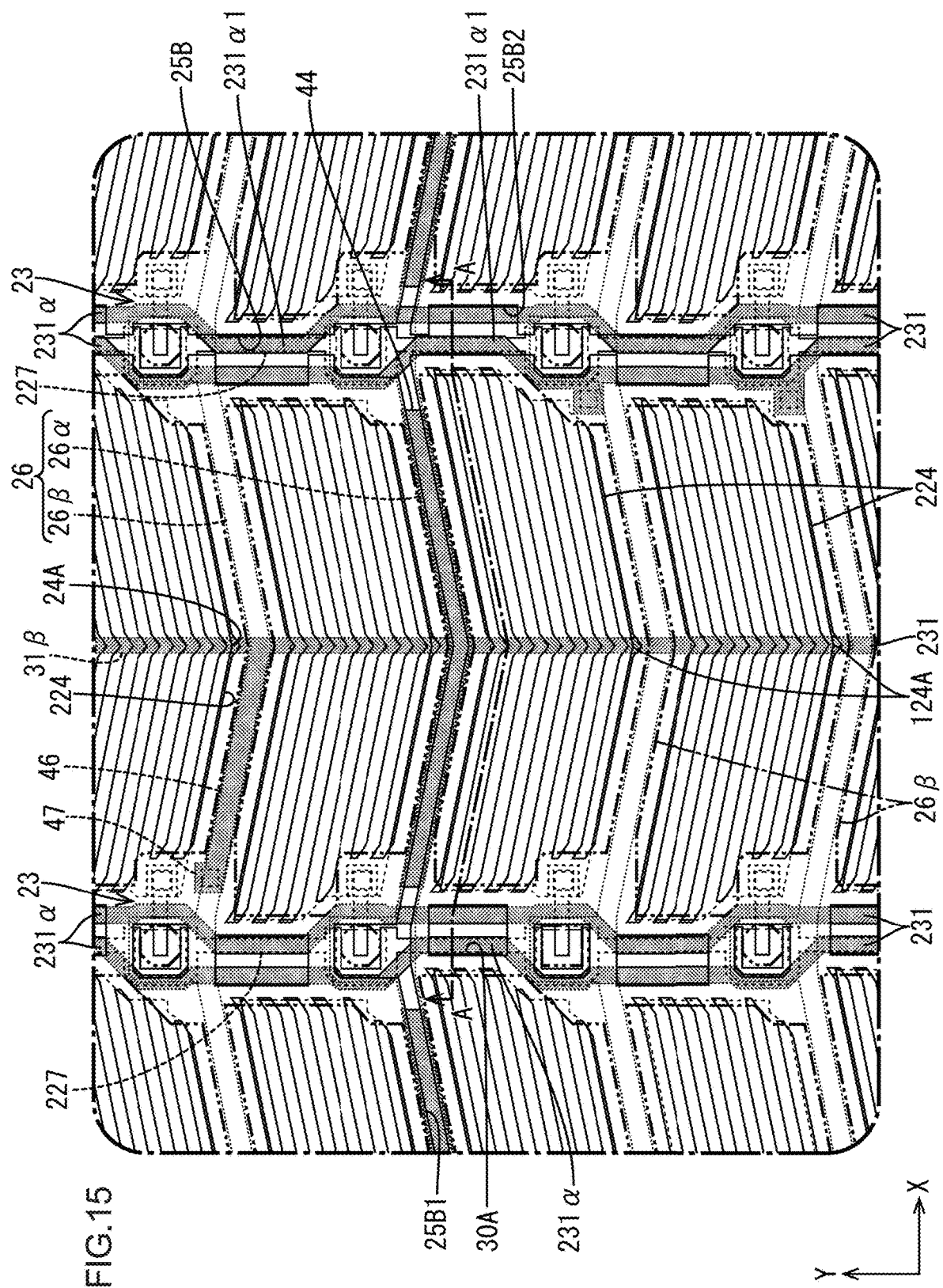
FIG. 15 is a plan view of an array substrate included in a liquid crystal panel according to a third embodiment illustrating a third metal film pattern.
Figure 16:
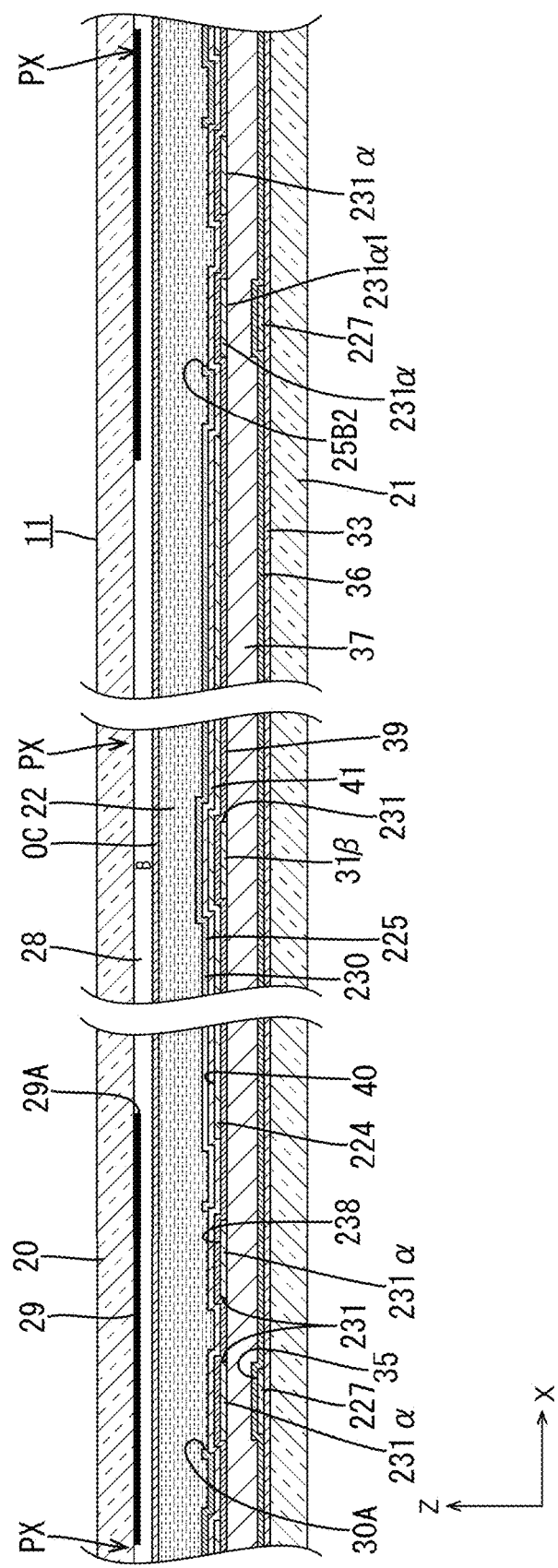
FIG. 16 is a cross-sectional view of an array substrate along line A-A in FIG. 15.

As illustrated in FIG. 15, the first touch lines 231α are disposed such that two first touch lines 231α separated from each other are adjacent to each pixel electrode 224 in the X-axis direction. Specifically, every two first touch lines 231α are disposed between two pixel electrodes 224 that are adjacent to each other in the X-axis direction. The number of the first touch lines 231α in this embodiment is 3,840, which is double the number of the first touch lines 31α in the first embodiment. The number of the touch lines 231 is triple the number of source lines 227. The number of the touch electrodes 230 is 5,760, which is 1.5 times the number of the touch lines 31 in the first embodiment. Because the number of touch electrodes 230 can be increased while the size (a length of one side) of the touch electrodes 230 is reduced. This further improves the definition of the sensing (the position detection). Two first touch lines 231α between the pixel electrodes 224 that are adjacent to each other in the X-axis direction are prepared from a third metal film 238 and separated from each other in the X-axis direction with a predefined gap in the X-axis direction as illustrated in FIG.

16. According to the configuration, a short circuit is less likely to be created between the consecutive two first touch lines 231α.

As illustrated in FIG. 15, every two first touch lines 231α between the pixel electrodes 224 that are adjacent to each other in the X-axis direction are two-dimensional arranged such that positional relations to the source lines 227 are similar to each other. Namely, sections of the first touch lines 231α overlap the source lines 227. Specifically, the first touch lines 231α are routed in zigzags to alternately overlap the source lines 227. More specifically, one of the first touch lines 231α includes source line overlapping portions 231α1 disposed adjacent to short side edges of the pixel electrodes 224 in odd rows from the top in the Y-axis direction in FIG. 15. The other first touch line 231α includes source line overlapping portions 231α1 disposed adjacent to short side edges of the pixel electrodes 224 in even rows from the top in the Y-axis direction in FIG. 15. The first touch lines 231α include about the same number of the source line overlapping portions 231α1. Therefore, parasitic capacitances between the first touch lines 231α and the source lines 227 are about equal to each other. According to the configuration, a difference in load of the first touch lines 231α is reduced. Therefore, display quality is less likely to decrease. Furthermore, accuracy and sensitivity in sensing are less likely to decrease.

In this embodiment, every two first touch lines 231α are disposed with the gap therebetween and the long edges thereof adjacent to the pixel electrodes 224. The sections of the first touch lines 231α overlap the source lines 227. Because the first touch lines 231α are disposed with the gap therebetween and the long edges thereof adjacent to the pixel electrodes 224, a short circuit is created between the first touch lines 231α. The sections of the first touch lines 231α overlap the source lines 227. In comparison to a configuration in which one of the first touch lines overlaps the source lines 227 but the other first touch line does not overlap the source lines 227, loads of the first touch lines 231α are equalized. Characteristics of signals supplied to a common electrode 225 are equalized. This configuration is preferable for maintaining the display quality at a high level.

OTHER EMBODIMENTS

The technology described herein is not limited to the embodiments described above and illustrated by the drawings. For example, the following embodiments will be included in the technical scope of the technology described herein.

(1) In each of the above embodiments, the pixel electrodes are configured such that the long dimension of the pixel electrodes corresponds with the X-axis direction and the short dimension of the pixel electrodes corresponds with the Y-axis direction. The X-axis direction corresponds with the direction in which the gate lines extend. The Y-axis direction corresponds with the direction in which the source lines extend. The pixel electrodes may be configured such that the long dimension corresponds with the Y-axis direction and the short dimension corresponds with the X-axis direction. The Y-axis direction corresponds with the direction in which the source lines extend. The X-axis direction corresponds with the direction in which the gate lines extend. It is preferable that first touch lines prepared from the third metal film are disposed to overlap the gate lines and parallel to the gate lines. Furthermore, it is preferable that second touch lines prepared from the third metal film and disposed parallel to the gate lines overlap the bending portions of the pixel electrodes.

(2) In each of the above embodiments, the liquid crystal panel has the display function and the touch panel function and the common electrode includes the touch electrodes separated from each other by the partition voids. However, the liquid crystal panel may have the display function but not have the touch panel function and the common electrode may have a non-divided structure. The touch lines may be configured as common lines connected to the common electrode. The common lines may include first common lines that overlap the source lines and second common lines that overlap the bending portions of the pixel electrodes. According to the configuration, the sufficient number of the common lines can be provided and thus unevenness in resistance distribution within a surface of the common electrode can be reduced. A voltage at the common electrode is stabilized and thus display quality can be improved.

(3) The two-dimensional shape of the pixel electrodes may be altered from that in each of the above embodiments where appropriate. For example, the two-dimensional shape of the pixel electrodes may include multiple bending portions. According to such a configuration, multiple second touch lines may be disposed to overlap the bending portions of each pixel electrode. A larger number of the touch lines may be provided. The two-dimensional shape of each pixel electrode including one bending portion may be altered from the two-dimensional shape illustrated in the drawings. For example, the bending portion may be located at a position relative to the long edge of the pixel electrode other than the middle.

(4) In each of the above embodiments, the ratio of the long dimension of each pixel electrode relative to the short dimension is 3. However, the ratio of the long dimension of each pixel electrode relative to the short dimension may be altered from 3. For example, if four colors of color filters (e.g., R, G, B, and white) are arranged in the Y-axis direction, the ratio of the long dimension of the pixel electrode to relative to the short dimension may be set to 4.

(5) In each of the above embodiments, the shielding portions coupled to the second touch lines are connected to the touch electrodes via the second contact holes. However, the second touch lines instead of the shielding portions may be connected to the touch electrodes via the second contact holes. In such a configuration, the shielding portions may be omitted.

(6) In each of the above embodiments, the touch electrode connecting portions are connected to the touch electrodes via the third contact holes. However, the touch electrode connecting portions may be omitted.

(7) The areas of the shielding portion and the touch electrode connecting portions in the plan view may be altered from those in each of the above embodiments where appropriate.

(8) In each of the above embodiments, the first touch lines are prepared from the third metal film. However, the first touch lines may be prepared from the second metal film from which the source lines are prepared. In such a configuration, it is preferable that the first touch lines may be separated from the source lines in the X-axis direction to reduce short circuits. Furthermore, the second touch lines may be prepared from the second metal film and the third metal film may be omitted.

(9) The ratio of the length of the source line overlapping portion of each of the first touch lines relative to the length of each source line non-overlapping portion or the area of each source line overlapping portion relative to the area of each source line non-overlapping portion may be altered from that in each of the above embodiments where appropriate. Although the first touch lines partially overlap the source lines in each of the above embodiments, the first touch lines may be disposed such that entire areas of the first touch lines may overlap the source lines.

(10) The routing of the source lines or the gate lines may be altered from that in each of the above embodiments where appropriate. For example, the source lines may be routed to extend linearly in the Y-axis direction.

(11) In the second embodiment, the first touch lines are prepared from the third metal film. However, the first transparent electrode film may include resistance reduced sections prepared by reducing resistances thereof and defined as the first touch lines.

(12) In the third embodiment, two first touch lines are disposed between the pixel electrodes that are adjacent to each other in the X-axis direction. However, three or more first touch lines may be disposed between the pixel electrodes that are adjacent to each other in the X-axis direction.

(13) In each of the above embodiments, the number of the gate lines is equal to the number of the pixel electrodes in the Y-axis direction and the number of the source lines is equal to the number of the pixel electrodes in the X-axis direction. However, the number of the gate lines may be double the number of the pixel electrodes in the Y-axis direction and the number of the source lines may be a half of the number of the pixel electrodes in the X-axis direction.

(14) In each of the above embodiments, the array substrate includes the bottom gate type TFTs that include the gate electrodes disposed below the channel regions. However, the array substrate may include top gate type TFTs that include gate electrodes disposed above channel regions.

(15) In each of the above embodiments, the liquid crystal material included in the liquid crystal layer has the positive dielectric constant anisotropy. However, a liquid crystal material having negative dielectric constant anisotropy may be used.

(16) The screen size or the resolution of the liquid crystal panel may be altered from that in each of the above embodiments where appropriate.

(17) The intervals between the pixels in the liquid crystal panel may be altered from those in each of the above embodiments where appropriate.

(18) In each of the above embodiments, four drivers are mounted on the array substrate. However, the number of the drivers on the array substrate may be altered where appropriate.

(19) In each of the above embodiments, the drivers are directly mounted on the array substrate using the chip on glass (COG) technology. However, a flexible substrate on which drivers are mounted using the chip on film (COF) technology may be connected to the array substrate.

(20) In each of the above embodiments, the gate circuits are provided on the array substrate. However, the gate circuits may be omitted and gate drivers having a function similar to that of the gate circuit may be mounted on the array substrate. The gate circuit may be disposed on only one of sides of the array substrate.

(21) The two-dimensional shape of the pixel overlapping holes in the common electrode may be altered from that in each of the above embodiments where appropriate. For example, the two-dimensional shape of the pixel overlapping holes may be a W shape or a linear shape. The number of the pixel overlapping holes or the intervals between the pixel overlapping holes may be altered where appropriate.

(22) In each of the above embodiments, the pixel overlapping holes are formed in the common electrode. However, common electrode overlapping holes may be formed in the pixel electrodes.

(23) In each of the above embodiments, the TFTs are two-dimensionally arranged in the matrix on the array substrate. However, the TFTs may be two-dimensionally arranged in zigzags.

(24) In each of the above embodiments, the black matrix (the inter-pixel blocking portion) is provided on the CF substrate. However, the black matrix (the inter-pixel blocking portion) may be provided on the array substrate.

(25) The semiconductor film from which the channels of the TFTs are prepared may be made of polysilicon other than the material used in each of the above embodiments. In such a configuration, bottom gate type TFTs may be used for the TFTs or top gate type TFTs including light blocking films below channels (on a side on which the backlight unit is disposed).

(26) The display mode of the liquid crystal panel may be different from the display mode in each of the above embodiments. For example, the display mode may be an IPS mode.

(27) In each of the above embodiments, the touch panel pattern uses the projected capacitance method. However, the touch panel pattern may use a mutual capacitance method.

(28) In each of the above embodiments, the transmissive liquid crystal panel is provided as an example. However, the technology described herein may be applied to reflective liquid crystal panels and semitransmissive liquid crystal panels.

(29) In each of the above embodiments, the two-dimensional shape of the liquid crystal display device (the liquid crystal panel or the backlight unit) is the horizontally-long rectangular shape. However, the two-dimensional shape of the liquid crystal display device may be vertically-long rectangular shape, a circular shape, a semicircular shape, an oval shape, an elliptic shape, a trapezoidal shape, or other shapes.

The invention claimed is:

1. A display device comprising: a liquid crystal layer; pixel electrodes each having an elongated shape and including bending portions in a middle with respect to a pixel electrode lengthwise direction; a common electrode overlapping the pixel electrodes via an insulator; conductive lines extending in a pixel electrode widthwise direction to overlap the bending portions of the pixel electrodes via an insulator, the conductive lines being electrically connected to the common electrode; switching components connected to the pixel electrodes; pixel lines extending in the pixel electrode widthwise direction and being connected to the switching components; and second conductive lines extending in the pixel electrode width direction and including sections overlapping the pixel lines via an insulator, the second conductive lines being electrically connected to the common electrode.

2. The display device according to claim 1, wherein
the common electrode includes position detecting electrodes separated from each other by partition voids and connected to at least the conductive lines or the second conductive lines, each of the position detecting electrodes being configured to form a capacitor between the each of the position detecting electrodes and a position input member with which position input is performed to detect a position of input by the position input member, and the display device further comprises a signal source electrically connected to the conductive lines and the second conductive lines and configured to supply common signals and position detection signals to the conductive lines and the second conductive lines through time division multiplexing.

3. The display device according to claim 2, further comprising:
second pixel lines extending in the pixel electrode lengthwise direction and being electrically connected to the switching components; and
a second signal source electrically connected to the second pixel lines and configured to signals to the second pixel lines to drive the switching components, wherein
the signal source is electrically connected to the pixel lines and configured to supply signals to the pixel line to charge the pixel electrodes.

4. The display device according to claim 2, further comprising second pixel lines extending in the pixel electrode lengthwise direction and being electrically connected to the switching components, wherein
the second pixel lines include void overlapping pixel lines disposed to overlap the partition voids between the position detecting electrodes that are adjacent to each other in the pixel electrode widthwise direction, and
the display device further comprises shielding portions disposed to overlap the void overlapping pixel lines via an insulator and electrically connected to the conductive lines.

5. The display device according to claim 4, wherein the shielding portions are connected to the position detecting electrodes via contact holes drilled through an insulator disposed between the shielding portions and the position detecting electrodes.

6. The display device according to claim 5, wherein
the shielding portions extend from the conductive lines to which the shielding portions are connected toward the partition voids between the position detecting electrodes that are adjacent to each other in the pixel electrode lengthwise direction, and
the shielding portions include distal ends being adjacent to the partition voids and being connected to the position detecting electrodes via the contact holes.

7. The display device according to claim 5, wherein
the shielding portions extend from the conductive lines to which the shielding portions are connected toward the switching components, and
the shielding portions include distal ends being adjacent to the switching components and being connected to the position detecting electrodes via the contact holes.

8. The display device according to claim 5, further comprising position detecting electrode connecting portions disposed to overlap the second pixel lines different from the void overlapping pixel lines via an insulator and electrically connected to the conductive lines, the position detecting electrode connecting portions being connected to the position detecting electrodes via second contact holes drilled through an insulator disposed between the position detecting electrode connecting portions and the position detecting electrodes.

9. The display device according to claim 1, wherein the second conductive lines include line overlapping portions overlapping the pixel lines and line non-overlapping portions disposed to cross the switching components but not overlap the pixel lines.

10. The display device according to claim 1, wherein the conductive lines and the second conductive lines include sections of a conductive film.

11. The display device according to claim 1, wherein
the second conductive lines include sections of a first conductive film disposed in a layer in which the pixel electrodes are disposed, and
the conductive lines include sections of a second conductive film disposed in a layer different from the first conductive film with an insulator between the first conductive film and the second conductive film.

12. The display device according to claim 11, further comprising common electrode connecting portions disposed between the pixel electrodes adjacent to each other in the pixel electrode widthwise direction, the common electrode connecting portions including sections of the first conductive film, wherein
the common electrode connecting portions are connected to the conductive lines via conductive line-side contact holes drilled through an insulator disposed between the conductive lines and the common electrode connecting portions, and
the common electrode connecting portions are connected to the common electrode via common electrode-side contact holes drilled through an insulator disposed between the common electrode and the common electrode connecting portions.

13. The display device according to claim 1, wherein
the second conductive lines are disposed such that two second conductive lines are adjacent to the pixel electrodes and separated from each other in the pixel electrode lengthwise direction, and
the second conductive lines include sections overlapping the pixel lines.

* * * * *